US012592062B2

(12) United States Patent
Shintani et al.

(10) Patent No.: US 12,592,062 B2
(45) Date of Patent: Mar. 31, 2026

(54) INFORMATION PROCESSING DEVICE AND INFORMATION PROCESSING METHOD

(71) Applicant: OLYMPUS CORPORATION, Tokyo (JP)

(72) Inventors: Koichi Shintani, Hachioji (JP); Akira Tani, Sagamihara (JP); Osamu Nonaka, Sagamihara (JP); Manabu Ichikawa, Hachioji (JP); Tomoko Gocho, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 260 days.

(21) Appl. No.: 18/537,951

(22) Filed: Dec. 13, 2023

(65) Prior Publication Data

US 2024/0112450 A1 Apr. 4, 2024

Related U.S. Application Data

(63) Continuation of application No. PCT/JP2021/025970, filed on Jul. 9, 2021.

(51) Int. Cl.
*G06V 10/774* (2022.01)
*G06V 10/764* (2022.01)

(52) U.S. Cl.
CPC .......... *G06V 10/774* (2022.01); *G06V 10/764* (2022.01); *G06V 2201/03* (2022.01); *G06V 2201/10* (2022.01)

(58) Field of Classification Search
None
See application file for complete search history.

(56) References Cited

U.S. PATENT DOCUMENTS

2019/0138806 A1 5/2019 Banerjee et al.
2021/0192738 A1 6/2021 Meguro
(Continued)

FOREIGN PATENT DOCUMENTS

JP 2019-087221 A 6/2019
JP 2021-048928 A 4/2021
(Continued)

OTHER PUBLICATIONS

International Search Report dated Sep. 21, 2021 received in PCT/JP2021/025970.

*Primary Examiner* — Leon Flores
(74) *Attorney, Agent, or Firm* — Scully, Scott, Murphy & Presser, P.C.

(57) ABSTRACT

An information processing device of the present invention is capable of collaboration with a learning device to determine whether an image group that has been obtained in time series by the first endoscope is an image group obtained at a first time or at a second time, and to create a first inference model for image feature determination of images for the first endoscope by performing learning with results of having performed annotation on the image group that was obtained at the second time as training data, the information processing device comprising at least one or a plurality of classifying processors that classify image groups constituting training data candidates, within an image group from the first endoscope that has been newly acquired, or an image group from a second endoscope, using the image group that has been obtained at the first time, when the first inference model was created.

20 Claims, 12 Drawing Sheets

(56)          References Cited

U.S. PATENT DOCUMENTS

| | | | |
|---|---|---|---|
| 2021/0287395 | A1 | 9/2021 | Ishikake et al. |
| 2021/0366593 | A1* | 11/2021 | Takenouchi ............ G06T 11/00 |
| 2021/0405344 | A1 | 12/2021 | Tojo |
| 2022/0296081 | A1* | 9/2022 | Nygaard Espeland ...................... G06V 20/46 |

FOREIGN PATENT DOCUMENTS

| | | |
|---|---|---|
| JP | 2021-100555 A | 7/2021 |
| WO | 2020/110278 A1 | 6/2020 |
| WO | 2020/194472 A1 | 10/2020 |

* cited by examiner

SCREENING　　　　OBSERVATION　　　　SCREENING
(ACCESS)　　　　(EXAMINATION)　　　　(ACCESS)

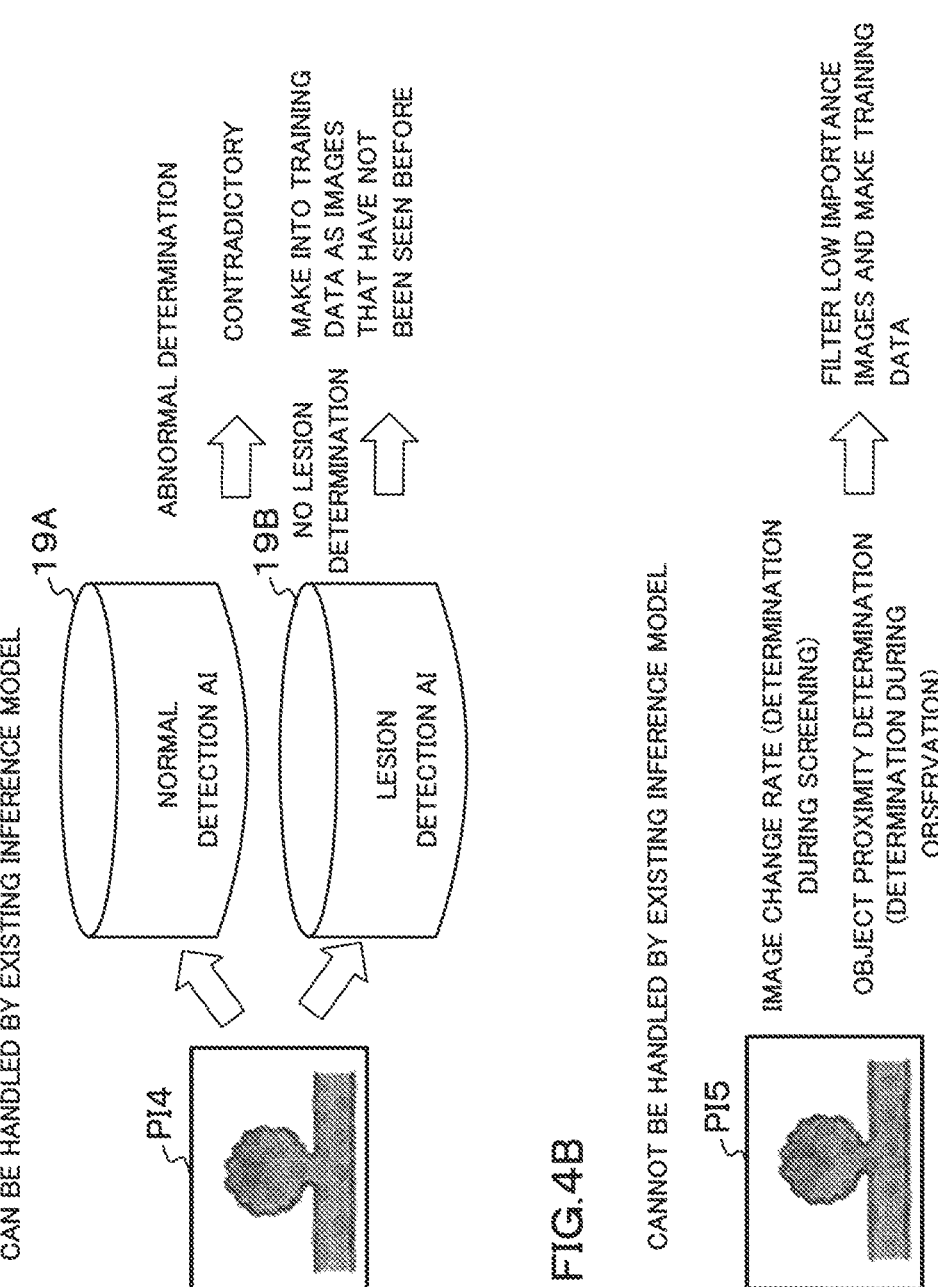

FIG.6

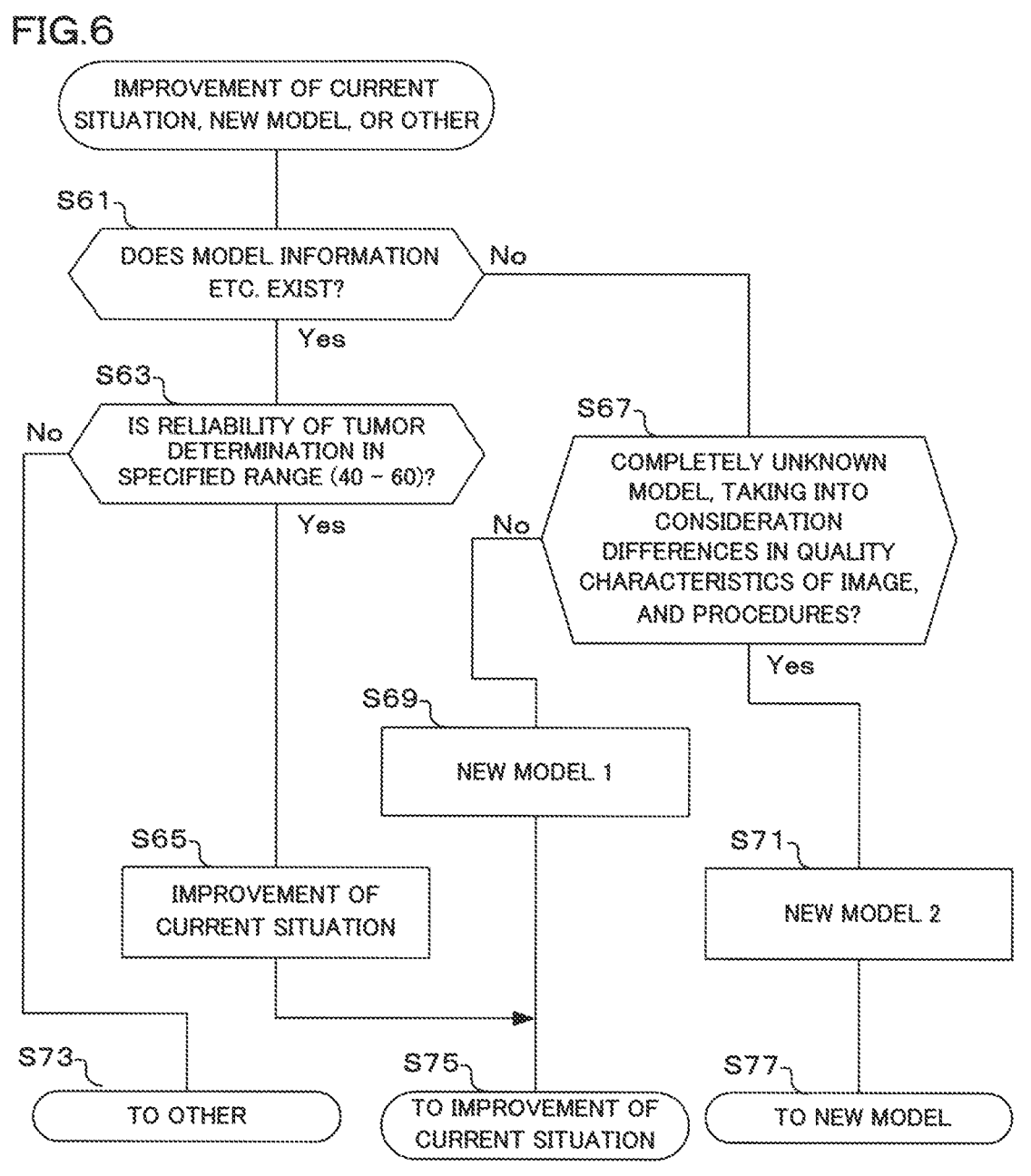

```
            ┌──────────────────────────────┐
            │   IMPROVEMENT OF CURRENT     │
            │ SITUATION, NEW MODEL, OR OTHER│
            └──────────────────────────────┘
                          │
   S61                    │
            ┌─────────────────────────┐  No
            │  DOES MODEL INFORMATION  ├──────────────┐
            │       ETC. EXIST?        │              │
            └─────────────────────────┘              │
                        │ Yes                         │
   S63                  │                  S67        │
   No  ┌──────────────────────────┐    ┌──────────────────────────┐
  ┌────┤  IS RELIABILITY OF TUMOR │    │   COMPLETELY UNKNOWN     │
  │    │    DETERMINATION IN      │    │   MODEL, TAKING INTO     │
  │    │  SPECIFIED RANGE (40~60)?│    │    CONSIDERATION         │
  │    └──────────────────────────┘    │  DIFFERENCES IN QUALITY  │
  │                 │ Yes              │ CHARACTERISTICS OF IMAGE,│
  │                 │             No   │    AND PROCEDURES?       │
  │                 │           ┌──────┤                          │
  │                 │           │      └──────────────────────────┘
  │                 │           │                 │ Yes
  │                 │   S69     │                 │
  │                 │  ┌─────────────────┐        │
  │                 │  │   NEW MODEL 1   │        │
  │                 │  └─────────────────┘        │
  │      S65        │           │        S71      │
  │  ┌──────────────────┐       │    ┌─────────────────┐
  │  │  IMPROVEMENT OF  │       │    │   NEW MODEL 2   │
  │  │ CURRENT SITUATION│       │    └─────────────────┘
  │  └──────────────────┘       │             │
  │          │                  ▶             │
  │          │                  │             │
  │ S73      │        S75        │    S77      │
  └──────────┐    ┌──────────────────┐  ┌─────────────┐
   │ TO OTHER │    │ TO IMPROVEMENT OF│  │TO NEW MODEL │
   └──────────┘    │ CURRENT SITUATION│  └─────────────┘
                   └──────────────────┘
```

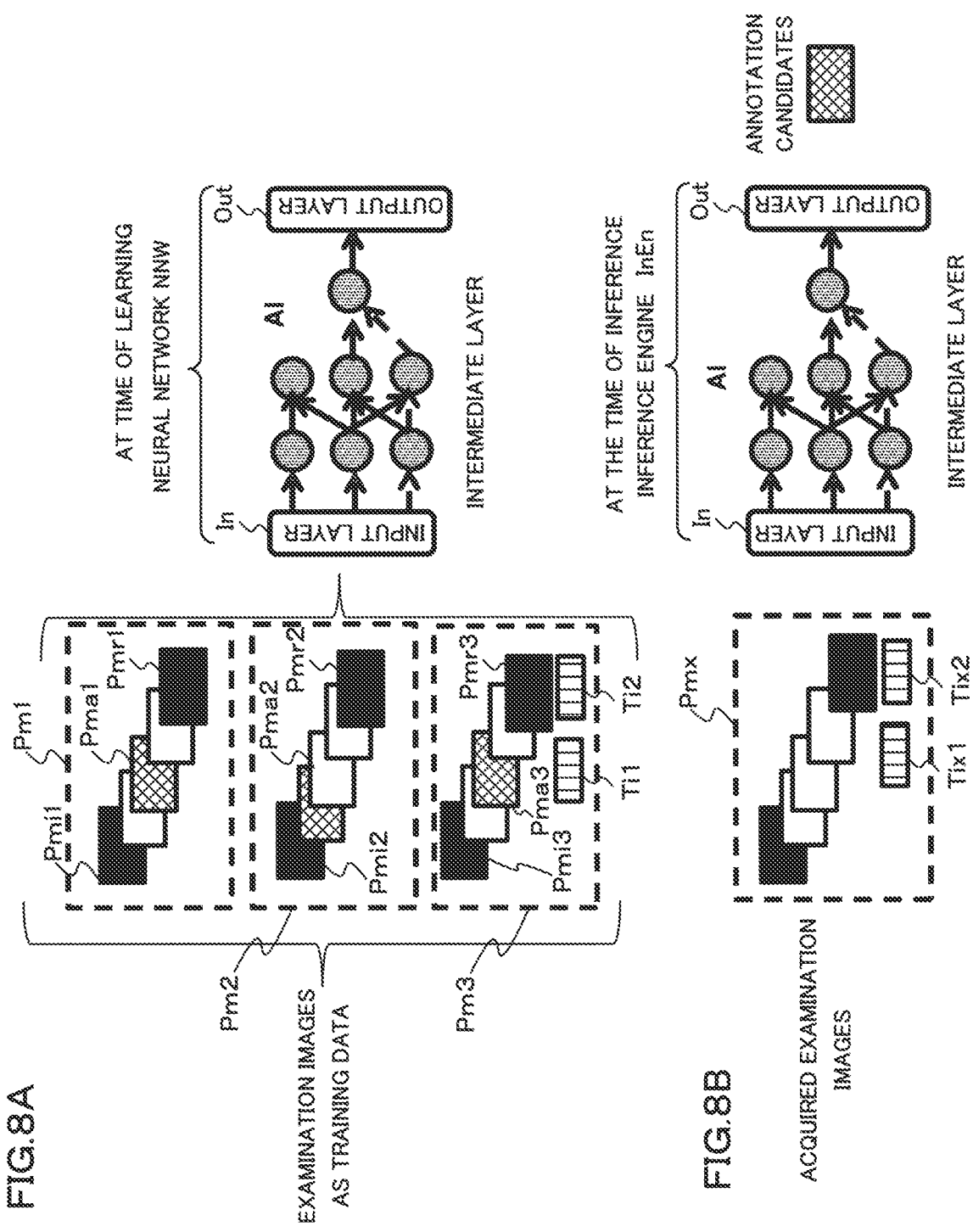

INFORMATION PROCESSING DEVICE AND INFORMATION PROCESSING METHOD

CROSS-REFERENCE TO RELATED APPLICATIONS

This application is a Continuation application of PCT Application No. PCT/JP2021/025970, filed on Jul. 9, 2021, the entire contents of all of which are incorporated herein by reference. The scope of the present invention is not limited to any requirements of the specific embodiments described in the application.

BACKGROUND OF THE INVENTION

1. Field of the Invention

The present invention relates to an information processing device and an information processing method that are capable of, when applying annotation to images that have been acquired by an inspection device such as an endoscope to create training data, and generating an inference model using this training data, making effective use of the image data that has been acquired.

2. Description of the Related Art

A signal analysis system and method have been proposed that, in order to generate an inference model (AI model), first of all collect raw data, and then extract and interpret data features from this raw data for inference model generation (refer to Japanese patent laid-open No. 2019-87221 (hereafter referred to as patent publication 1)). Specifically, with this signal analysis system, input is raw signal data, feature origins are mapped to region/applied knowledge by tracing back to signal data. Features are then extracted by using a deep learning network, a machine learning model is implemented for the purpose of sensor data analysis, and causal relationship analysis is performed for the purpose of fault prediction.

With the signal analysis system described in patent publication 1, classification is continuously performed using specialist instructions, and it is possible to make effective use of data. However, sensors for generating raw data have different characteristics etc. for each sensor, as a result of which, when generating a machine learning model (inference model) by performing deep learning, it is necessary to take into consideration differences in characteristics for each type (such as sensors that have been mounted in a device etc.), but this point is not considered in patent publication 1. With patent publication 1, therefore, it there are different types of sensors it is difficult to make annotations of the same quality for each type.

Also, although there may be cases where a machine learning model (inference model) is generated by inputting data from sensors having unknown characteristics, there is also no consideration of this point in patent publication 1. It is therefore difficult to handle unknown conditions with patent publication 1.

SUMMARY OF THE INVENTION

The present invention provides an information processing device and information processing method that are capable of effectively generating an inference model in cases where data of sensors of differing characteristics has been input, and cases where data can be considered unknown conditions.

An information processing device of a first aspect of the present invention is capable of collaboration with a learning device to determine, for the purpose of performing determination of specified image features, for images that have been obtained successively from a first endoscope, whether an image group that has been obtained in time series by the first endoscope is an image group obtained at a first time or an image group obtained at a second time, and creates a first inference model for image feature determination of images for the first endoscope by performing learning with results of having performed annotation on an image group that was obtained at the second time as training data, the information processing device comprising at least one or a plurality of classifying processors that classify image groups constituting training data candidates, within an image group from the first endoscope that has been newly acquired, or an image group from a second endoscope, using an image group that has been obtained at the first time, when the first inference model was created.

An information processing method of a second aspect of the present invention is capable of collaboration with a learning method to determine, for the purpose of performing determination of specified image features, for images that have been obtained successively from a first endoscope, whether an image group that has been obtained in time series by the first endoscope is an image group obtained at a first time or an image group obtained at a second time, and creates a first inference model for image feature determination of images for the first endoscope by performing learning with results of having performed annotation on an image group that was obtained at the second time as training data, the information processing method comprising classifying image groups constituting training data candidates, within an image group from the first endoscope that has been newly acquired, or an image group from a second endoscope, using an image group that has been obtained at the first time, when the first inference model was created.

A non-transitory computer-readable medium of a third aspect of the present invention, storing a processor executable code, which when executed by at least one processor, performs an information processing method that is capable of collaboration with a learning method to determine, for the purpose of performing determination of specified image features, for images that have been obtained successively from a first endoscope, whether an image group that has been obtained in time series by the first endoscope is an image group obtained at a first time or an image group obtained at a second time, and creates a first inference model for image feature determination of images for the first endoscope by performing learning with results of having performed annotation on an image group that was obtained at the second time as training data, the information processing method comprising classifying image groups constituting training data candidates, within an image group from the first endoscope that has been newly acquired, or an image group from a second endoscope, using an image group that has been obtained at the first time, when the first inference model was created.

BRIEF DESCRIPTION OF THE DRAWINGS

In the information processing system of the one embodiment of the present invention, and its peripheral systems.

FIG. 4A and FIG. 4B are drawings showing a case where it is possible for an existing inference model to correctly perform inference on input images and a case where it is not possible for an existing inference to correctly output for an input image, in the information processing system of the one embodiment of the present invention and its peripheral systems.

In the information processing system of the one embodiment of the present invention.

FIG. 6 is a flowchart showing operation of determination as to whether, in the information processing system of the one embodiment of the present invention and its peripheral systems, there is current improvement, a new model, or something other than that.

FIG. 8A and FIG. 8B are drawings for describing generation of an inference model for performing inference of images that should be subjected to annotation, and inference that uses the inference model that has been generated, in the information processing system of the one embodiment of the present invention.

DETAILED DESCRIPTION OF THE PREFERRED EMBODIMENTS

Figure 1A:
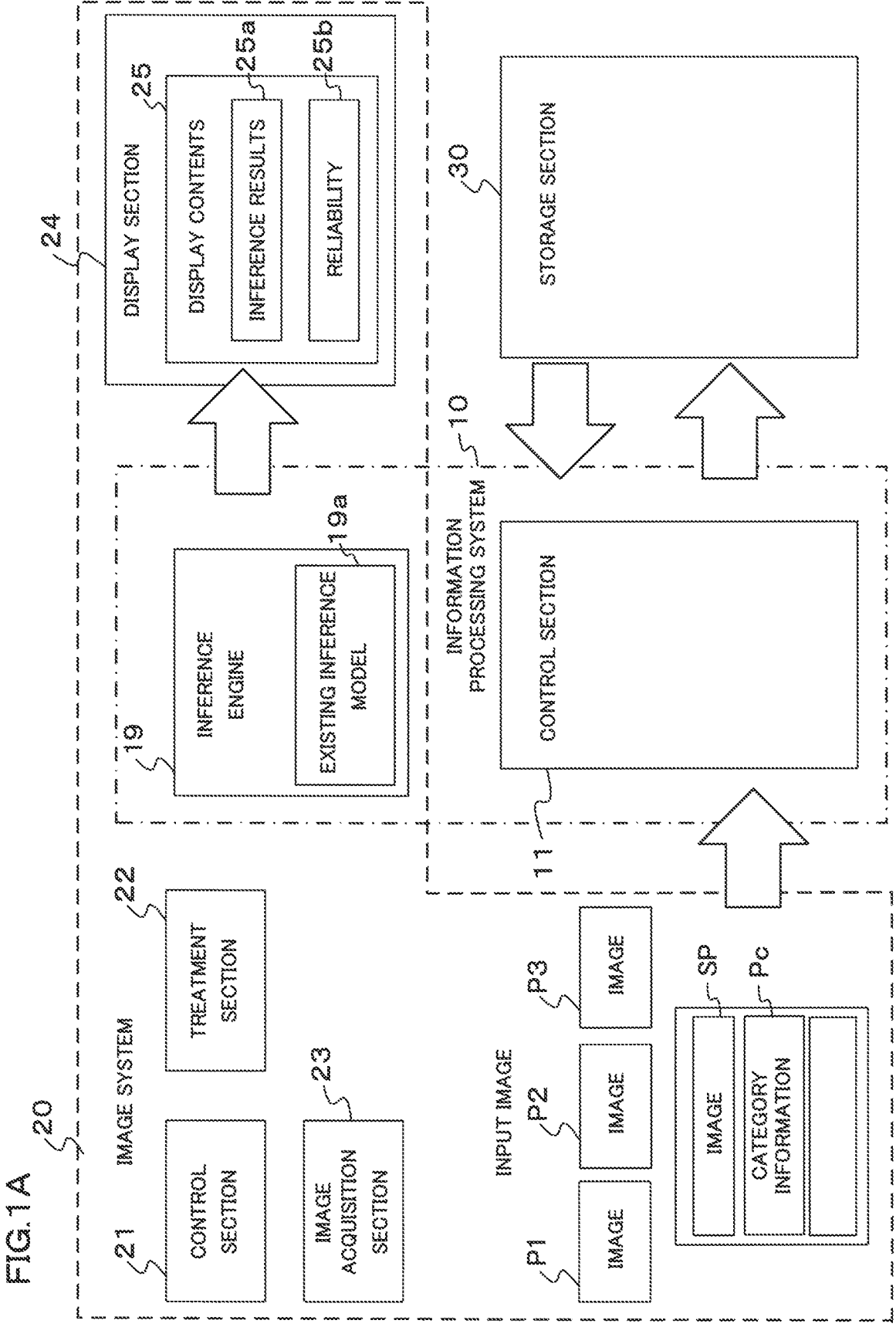
FIG. 1A is a block diagram showing the structure of an information processing system of one embodiment of the present invention and its peripheral systems.

The information processing device and information processing method of one embodiment of the present invention effectively collect new training data when creating a new inference model or improved inference model. In order to do this, features of so called previous training data that, was used when performing machine learning for creating an already proven inference model, are used. Previous training data that was used at the time of creation of an already proven inference model have often taken considerable effort to make. This is because selecting images that depict physical objects that should be detected from among countless images required serious effort.

Consequently, with the one embodiment of the present invention, at the time of creating an inference model that is the same or similar as an inference model that was obtained by learning training data that was obtained by annotation of some frames of continuous images, in a case where a number of image frame is too massive, in performing annotation of frames for training data it is desirable to perform narrowing down of image frames. Therefore, before annotation, sorting of annotation image frames is performed, modeled on creation history of exemplary inference models. That is, at the time of exemplary inference model creation image frames that are not subjects of annotation, among continuous images are taken into consideration. A step is provided to make annotation candidate images by sorting from among newly acquired continuous images by doing this, for a new (or improved) inference model, (refer, for example, to S5 and S7 in FIG. 3A, S103 and S107 in FIG. 3C, and S29 and S39 in FIG. 5B). In the case of an inference model with a specification that has been proved, it is likely that the training data will also have a proven record. Accordingly, in the case of creating an inference model of a similar specification, reducing superfluous work by imitating an inference model having a proven track record to select image frames of training data candidates is effective.

Inference models are used in various situations, and even for examples of endoscopes of varying specifications, there are inference models for guidance as to where to access and that performs navigational display etc. with that process, inference models designed so as not to miss lesions or the like and for promoting alerts to physicians, inference models for how to observe when observing things that are believed to be lesions, and inference models for distinguishing what an object is. In the examples below, there will mainly be descriptions for inference models for distinguishing and observing, but it goes without saying that the description can also be applied to inference of other specifications. Training data is made by selecting necessary frames based on a video taken of the state of either a series of examinations or treatments.

For example, even if there is an examination time of only 10 minutes, as long as there is a video resulting from rapid shooting of 60 frames per second, in order to consider smoothness of image change, there will still be a large number of frames, namely 36,000 frames. Moreover, in the case of creating an inference model for lesion detection, for a digestive system endoscope, access images from a body cavity up to an affected part of a digestive organ will not be used, and the number of those images is very large. Also, the number of images when removing the endoscope after affected part confirmation is similarly large. Accordingly, this leads to search images of affected parts from among images that remain after having removed these access images. Incidentally, when creating an inference model of a different specification, the fact that there may be cases where access images are important is added as a postscript.

Next, whether or not there is a lesion is confirmed in the remaining images, while trying not to miss a plurality of regions. By performing this confirmation operation, images are classified into no affected part confirmation images, and confirmation images having an affected part are found, in order to confirm what the affected parts are. Normally, confirmation images with no affected part are in the majority. Confirmation images with affected parts are selected, a specialist such as a physician looks at the frames depicting an affected part, and implements annotation that there is an affected part in that area. Conversely, in confirming that affected part, even if there is only footage for one minute, there will be 3,600 frames of interest. Performing annotation for every single frame (such as entering the disease name, symptom, and range of affected part etc.) would take a vast amount of effort.

It is difficult to create an inference model that is capable of handling many cases from a single case, and so it is desired to devise a scheme for processing stages of information to narrow down to only results of having removed access images and confirmation images with no affected part from among an image group, as images that will be subjected to annotation. If this narrowing down is not performed well, then physicians and specialists will have to perform a tremendous amount of working outside their area of expertise. Specifically, if access images and confirmation images with no affected part are not removed, there will still be a massive number of endoscope images. It will then not be possible to take sufficient time on main operations, such as correct region designation in confirmation images where there are main affected areas, and wasted time until main operations are completed will be increased. This means that it will become impossible to quickly and effectively create an inference model that has been learned using high quality training data.

Examples have been described above for when confirming affected parts, distinguishing what type of lesion that affected part is, and creating an inference model such that a range in which a lesion has spread is detected. However, the present invention is not limited to this example, and also includes creation of an inference model for correct guidance of endoscope operations, and creation of an inference model for preventing overlooking to find affected parts that are easy to miss. In the case of creating this inference model, images of scenes in which operation of an endoscope should be guided, and images that are easy to overlook, etc. constitute training data. In these cases also, similar to the above described reasons, there are tens of thousands of subject images constituting candidates for training data corresponding to main scenes, and it cannot be said that requesting a specialist to perform selection of images from among a number of frames and performing annotation would be effective use of their time and effort.

That is, there are cases such as creating an improved version of an inference model that already exists, or newly creating an inference model of similar specifications for other than an assumed model. In these types of cases, it becomes possible to create an inference model efficiently by taking into consideration a method of image discrimination that was used at the time of creating the inference model of a similar specification that has previously been proven. Images that have been acquired by use of an endoscope are collected by means of a similar process for each examination. In a process for creating an inference model, information such as access images, confirmation images with no affected part, and confirmation images with an affected part, do not need to be added to all frames of endoscope images. If there is information on results that have been chosen in many processes of training data creation, this information is diverted, and it becomes possible to simply narrow down what type of images would constitute training data.

That is, in the case of creating an inference model by learning training data that has been acquired by performing annotation in some frames of continuous images, it is necessary to have a process to find training data candidates from among many frames. However, if there are conditions such as creating an inference model of preexisting exemplary specifications, image frames that are not objects of annotation, from among original continuous images at the time training data was created at the time of creating the exemplary inference model, are taken into consideration. Image candidates other than objective ones may then be removed from continuous images that have been newly obtained, and annotation candidate images may then be determined from the remaining frames. It is possible to utilize know how at the time of the exemplary inference model creation, for using a learning method, learning system, or program that follow this type of step.

For example, using images that constitute training data and all of the endoscope images, it is also possible to create a special inference model that performs inference. Utilizing the way of thinking described above, for endoscope video information that has been obtained at the time of a specified examination, annotation information is attached to frames corresponding to training images within this endoscope video, and video information that has been obtained as a result of this processing is made training data. Further, training data is created by similarly attaching annotation to endoscope video images (may include images that have been inserted or removed) for a plurality of examination results. If training data has been created, it is possible to create an inference model by performing learning such that input is made an endoscope video that includes insertion and removal images, and output becomes training data frames.

With the method for creating an inference model described above, there is a possibility that training data images that should be acquired might be missed under the following two conditions. That is, under the following two conditions, it is expected that there will be a possibility of overlooking training data candidates. First, as a first reason, there are cases where the expected endoscope (an endoscope with a proven track record for which an inference model has already been created) will be used. For endoscope images besides those of a normal pattern, such as rare cases that are completely different to those seen up to now, and patterns accompanying procedure that are different from normal, images that can be obtained and ways of observing and operation are also different, and so there is a possibility that it will not be correctly inferred as training data. Also, as a second reason, for an endoscope device that has different ways of operation and image quality to those of the expected endoscope, there is a possibility that it will not be possible to infer training data correctly. Regarding these cases, it is desirable to relax conditions of images to be made into training data as much as possible, so that they are not missed. Accordingly, with this embodiment of the present invention, a method is being adopted such that for cases where there is a shortage of previous examples, images are missed out from order of low priority as much as possible, to handle these cases effectively, while considering the unexpected. Also, in applying annotation to training data candidates it is preferable to have a specialist such as a physician at the time of lesion discrimination etc., and that support may be performed using an existing inference model. It is also possible to have a method whereby if a physician indicates OK, that result is directly made into training data.

Description will be given for an example where the present invention has been applied to an information processing system and its peripheral systems, as one embodiment of the present invention. This system is a system in which an inference model for an examination device such as a first endoscope (for example, an existing endoscope) is created or improved, and is also in control of training data etc. at the time an inference model for the examination device such as the first endoscope was created. Training data being managed is in order to use training data at the time of improving an inference model, or creating an inference model of another specification. Alternatively, this is because it is preferable to control training data and endoscope images that will constitute the sources of that training data, in order to clarify history of an inference model. Further, this is not only a system for improving existing models, but also incorporates consideration of creation of inference models for examinations devices such as a second endoscope that is different to the examination device such as the first endoscope. An inference model for an examination device such as the first endoscope that has been created here performs determination of specified image features, such as whether or not there is a lesioned part such as a tumor, in images that have been obtained from the examination device such as the first endoscope (refer, for example, to S25 in FIG. 5B).

Control of training data and endoscope images that will constitute the sources of that training data, that should clarify history of an inference model, has been described. However, endoscope images that constitute sources images that have been obtained at the time of endoscopic examination of a specified patient are stored, for example, in a format such as video, or in a suitable format such as still images that have been taken by a physician during examination. Since an endoscope is inserted into a body cavity, and examination is performed, a video is obtained in the process removing the endoscope from the body cavity, and a video that is made up of a series of image frames for more than a few minutes, or relevant still pictures, is stored for every patient and case. This video includes image groups in a time series manner for the time of insertion, time of examination, and time of removal, and as images at the time of examination there are an image group that is being closely examined after affected parts have been found, and an image group that is being screened to check there is no lesion. That is, description is given for image groups of the image strings along various time axes being divided into a plurality of image groups. The plurality of image groups may be most simply described as first and second image groups.

In particular, if an image group for the time of examination is divided into two, an image group that has been obtained in time series using the first endoscope may be made into an image group obtained at a first time (unnecessary images during access), and an image group obtained at a second time (required images at a time when affected parts such as a tumor are being searched for). For example, in a case of determining which these images are also (refer, for example, to S5 in FIG. 3A, S23 in FIG. 5B, and images Ps and Po etc. in FIG. 3B), they may be referred to as the first time or the second time, but an image group at the time of insertion or the time of removal may also be made third or fourth image group, respectively. Also, if it is considered that an insertion image group and a removal image group are also indicating accessing state, they may be included in the first time. Here, description will be given with affected part images included in images for the second time.

In a case where there is an affected part in an image group for the first time, they may be made images for the second time, and if it then turns out that there is no affected part in the images for the second time these images may be reclassified in an image group for the first time. The first time and the second time are not groups where a time series image group is divided into two at a specified time point, and what they are is zoning with a plurality of times within a time series or a time axis, by determining accordingly that here is the first time, here is the second time, again the first time etc.

Figure 1B:
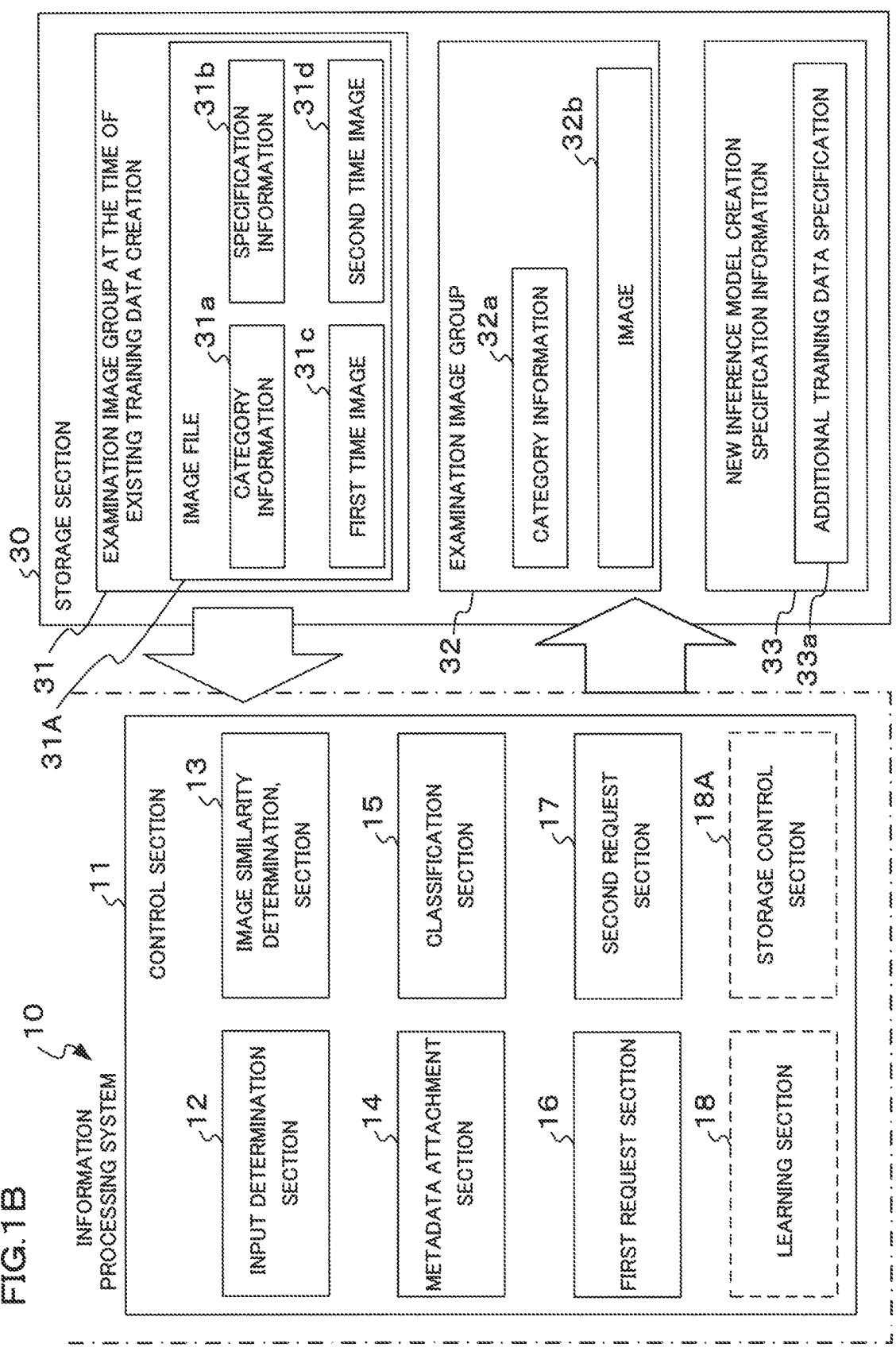
FIG. 1B is a block diagram showing a partial structure within the information processing system of the one embodiment of the present invention, and its peripheral systems.

Also, the information system cooperates with a learning section having a proven record of having created an inference model that has already been created (for example, the learning section 18 in FIG. 1B). This inference model is a first inference model for feature determination of images for a first endoscope, and results of having performed annotation on an image group obtained at the second time as described above are learned as training data.

This information processing system is proven to have created an inference model for a first endoscope, and so is one step ahead in creating a similar inference model for other types of endoscope etc. Therefore, a new inference model is also created for an unknown second endoscope that is completely different to the first endoscope, using image groups that were suitable in creating the first inference model, and there may be a function such as collecting and controlling training data. There is provided a classification section (for example, the classification section 15) for classifying images so as to produce effective training data, from an image group that has been acquired from the second endoscope in this way.

As has been described above, with the one embodiment of the present invention, it is possible to classify images from a second endoscope that is different to the first endoscope. This means that in cases such as where the second endoscope is an unknown endoscope that is different to the first endoscope also, it is possible for the information processing system to effectively collect images that are suitable for generation of an inference model for the second endoscope. That is, improved efficiency is brought about by adopting training data, technology and logic, and knowhow, etc. for when an inference model was created for the first endoscope. Specifically, there is a proven record of, when creating training data for the first endoscope, having extracted frames constituting training data from among the massive amount of video frames collected for each single examination, and having created an inference model using that training data. As a result, in the case where a video for a single examination has been acquired from the second endoscope, in order to create (allow learning of training data) an inference model for the second endoscope with the same way of thinking as at the time the inference model was created with the first endoscope, it is possible to select frames that can be used as training data from within the acquired video.

That is, frames that became training images are selected from among a series of endoscope images that were obtained at the time of examination one time using the first endoscope, and learning of an inference model may be performed with those frames of the training images among the series of images that have been subjected to annotation as training data. This is because with only a single examination training data is insufficient, and the same processing is performed for many further examination results. Learning is performed with an endoscope examination image frame group that includes images for insertion or removal as input information at the time of learning, and frames adopted as training data as output information, to create an inference model. It can be thought of as once an inference model has been created, an examination image group of the second endoscope is input to the inference model, and training data candidates are output as inference results.

FIG. 1A and FIG. 1B are block diagrams showing the structure of an information processing system, and its peripheral systems, of the one embodiment of the present invention. This system comprises the information processing system 10, an image system 20 and a storage section 30. FIG. 1A shows the whole of this system, while FIG. 1B shows the structure of parts of the control section 11 and storage section 30 within the information processing system 10. The image system 20 is included in an examination device such as an endoscope, and acquires image data such as endoscope images. The information processing system 10 acquires the image data that has been acquired by the image system 20, and this image data that has been acquired is stored within the storage section 30. Also, training data is created by performing annotation on the image data that has been acquired, and an inference model is generated using this training data. In the case of a system that has utilized the inference model 19*a*, it is preferably made possible to establish what training data that inference model was learned with, and there is also a request for historical transparency. The training data and history are stored in the storage section 30.

The information processing system 10 is provided on one or a plurality of servers etc. The storage section 30 is also provided on a server etc. The information processing system 10 and the storage section 30 may be provided on the server, or may be provided in a distributed manner. Also, the learning section 18 is described as being provided within the information processing system 10 in this embodiment, but may also be provided outside of the information processing system 10. The image system 20, information processing system 10, and storage section 30 are respectively connected by means of a communication network such as the internet or an intranet, and may be capable of data communication.

The image system 20 is provided within an examination device such as an endoscope, as was described previously. This image system 20 comprises a control section 21, treatment section 22, image acquisition section 23, and display section 24. The image system 20 also has, besides each of the above described sections, a communication section (having a communication circuit), and it is possible to perform commination to transmit and receive to and from the information processing system 10 etc. by means of the communication section.

The control section 21 controls the whole of the image system 20. The control section 21 is made up of one or a plurality of processors having a processing device such as a CPU and a memory or the like that stores programs, and can control each section within the image system 20 by executing programs.

The treatment section 22, using an endoscope inserted inside the body or the like, performs treatment in order to observe inside the body. An industrial endoscope or clinical endoscope are basically imaging devices that are inserted inside something and observe the inside, but in actual fact they are not only imaging devices but devices and facilities for insertion and observation. The treatment section 22 adjusts position and direction of the imaging section provided at a tip end of the endoscope, and since functions such as water injection and suction etc. are needed as required, dedicate tubes etc. are additionally provided, to satisfy these functional requirements. Also, driving of treatment tools (biopsy forceps, endoscopic snare, high frequency knife, injection needle etc.) in order to perform biopsy and treatment is performed. Functions such as medication are also included in the treatment section 22. Further, the treatment section 22 has an illumination section etc., and as well as illuminating the inside of the body, the illumination section may switch light source characteristics (wavelength etc.), and in that way be made capable of acquiring reflection images of object surfaces and a subject at a deeper position. Also, in a case where there are functions where coloring or fluorescence imaging is possible, the treatment section 22 may also have functions to handle that.

The image acquisition section 23 includes a photographing lens, image sensor, imaging control circuit, image processing circuit etc., and acquires image data. At the time of examination, a tip end of the endoscope is inserted into the body, and it is possible to acquire image data of the inside of the body, for example, inside of the esophagus, stomach, and intestines, using the image acquisition section 23. The image acquisition section 23 may have functions of zoom, close-up, and 3D information acquisition. Also, the image acquisition section 23 may also have a plurality of imaging sections, and as has been described above, may be capable of various image analysis by cooperating with switching of illuminating light etc. and acquiring images of differing characteristics even in the same area.

The image acquisition section 23 can acquire images continuously at the time the tip end of the endoscope has been inserted into the body. With an endoscope examination to observe the inside of the body, particularly along the digestive tract, the tip end of the endoscope is inserted from a body cavity such as, for example, the mouth, nostrils or anus, observation for confirmation is commenced from commencement of that insertion. And, examination at various locations is then actually performed, the tip of the endoscope is finally removed from the location at which it was inserted, and the examination is then completed. As a result, in the endoscope examination images that are extremely similar can be obtained for every examination. Advancing along a course while confirming imaging results can be said to be a technique such as driving a vehicle, but the above points are significantly different. Therefore, the image acquisition section 23 can commence image acquisition when the tip end of the endoscope has been inserted inside the body, and continuously acquire images until the tip end of the endoscope is removed upon completion of the examination.

In FIG. 1A, input images P1, P2 and P3 are image (may be represented as a video and each frame making up that video) data that has been acquired continuously. Also, input image SP may be a frame within a video, and may be acquired for deliberate storage by a physician or health care professional, and is image data of a still picture, as it were. In the current situation where various inference models are designed so as to determine what is being depicted at what part within a still picture, the expression "input image" is taken in the sense of the inference model. A video is often used at the time of inference, and since each frame of a video is input to an inference model, although it is not necessary to deliberately explains as still pictures, they are represented in an easy to understand manner. Obviously there are also cases where inference is performed from a plurality of frames, and in such cases it is not necessary for input images to be still pictures. However, with the expression of "still picture", it is easy to imagine the intended use, such as applying various annotation to normal photographs and storing, and so it seems like that image will be diverted and category information Pc is associated with this input image SP. It should be noted that in FIG. 1A, only three input images P1-P3 have been depicted, but many images are acquired.

Category information Pc (one type of the above described annotation) is, for example, information relating to the device that has acquired the images, such as manufacturer of the endoscope, model name etc. Category information may also be attached to respective image of images P1-P3 also, and a plurality of image groups may be made into a file, and category information associated with this image file. Image quality differs in accordance with image sensors and image processing circuits etc. inside the image acquisition section 23, but if this category information Pc is attached to the image data it is easy to understand what type of image characteristics there are. Also, the empty space below the category information Pc is a region for storing other annotations as metadata. If various accompanying information is stored in this region and set to an image, there is no need to determine content of the image, and by looking at the metadata what type of image it is will be understood, and it will be possible to search for images using other information, such as conditions at the time of imaging and supplementary information etc. Obviously, it is also possible to increase efficiency of learning and inference using this type of metadata. If annotation information is attached at the time of learning, high speed learning with a method such as multi-model inference becomes possible at the time of inference.

The display section 24 has a display, and can display endoscope images that have been acquired by the image acquisition section 23. At the time of this display, display may also be combined with display content 25 that has been inferred by the inference engine 19 within the information processing system 10, that is, inference results 25*a* and reliability 25*b*. As the inference results 25*a*, position of a lesioned part such as a tumor is displayed on an endoscope image that has been acquired by the image acquisition section 23.

The information processing system 10 has the inference engine 19 that is provided with the control section 11 and an existing inference model 19*a*. The control section 11 controls the whole of the information processing system 10. The control section 11 is made up of one or a plurality of processors having a processing device such as a CPU and a memory or the like that stores programs, and can control each section within the information processing system 10 by executing programs. As shown in FIG. 1B, an input determination section 12, image similarity determination section 13, metadata attachment section 14, classification section 15, first request section 16, second request section 17, learning section 18, and storage control section 18A are provided within the control section 11. What type of training data was used in the learning to obtain the existing inference model 19*a* requires transparency of history, and information on history and specification etc. is stored in the previously described storage section 30.

The input determination section 12 is input with image data that was acquired by the image acquisition section 23. In a case where the information processing system 10 and the image system 20 are connected by means of a communication network such as the Internet or an intranet, image data such as input images P1-P3 and SP etc., and category information, are input by means of this communication network.

Also, the input determination section 12 determines category information and metadata associated with this image data that has been input. Also, it is determined whether or not there are images from the second endoscope, based on inference results at the time that images that were acquired using the image acquisition section 23 were input to the existing inference model 19*a* (refer, for example, to S23 in FIG. 5B). The existing inference model 19*a* was generated based on images from the first endoscope, and for images from the second endoscope reliability of inference results will be lowered. The input determination section 12 functions as an input determination section (processor for input determination) for determining if there are images from the second endoscope, in accordance with results at the time that images were input to the first inference model (refer, for example, to S23 in FIG. 5B). The input determination section 12 functions as a video acquisition section for acquiring a new examination video, at the time of learning by the learning section in order to create a second inference model that is different to the first inference model (refer, for example, to S21 in FIG. 5B).

Also, the input determination section 12 determines characteristics etc. in a case where category information Pc has not been associated with the input images, by taking into consideration various information, such as unit type of the image system 20, image quality (optical specifications), situation regarding image illumination, image angle of view, image shape etc. Also, characteristics etc. of input images may be determined based on shape etc. of surgical tools depicted together within an image, and, if there is a video, operating status etc. Here, it is possible to determine what type device images are from, determine what type of usage the same device had, and determine a physician who was operating the device, ability of the health care professional, etc.

The image similarity determination section 13 performs determination as to which of images stored in the first time image section 31*c* or the second time image section 31*d*, within the examination image group at the time of existing training data creation 31 of the storage section 30, the images that have been input by the input determination section 12 are similar to. What data was adopted as training data and what data was not adopted as training data, and what annotation data was adopted, at the time of creation of the existing inference model, is stored in the first time image section 31*c* and the second time image section 31*d*. For example, if the existing inference model 19*a* is an inference model for distinguishing, there will be images that were acquired at the first time, that is, images that were acquired at the time a physician etc. accessed a lesioned part such as a tumor. First time images that are stored in the first time image section 31*c* are images that are not generally adopted as training data for generating an existing inference model (first inference model) for the first endoscope. Second time images that are stored in the second time image section 31*d* are images that were acquired at the second time, that is, at a time a physician or the like performed an examination to find a lesioned part, or images adopted such as a lesioned part.

From the viewpoint of characteristics of the endoscope and safety, it is preferable to have operation confirmed visually. Because of this, images from a process for insertion up to examination at a specified location, and images of a process for removal after the examination, also remain as images. Contiguously, processes going deeper and conversely processes coming out also remain as images. Regardless of what type of user uses what type of equipment for what type of physical object, there are characteristics of image change that are common. These types of images that have been acquired at the first time and/or images that have been acquired at the second time, or, further, images that have been acquired at a third and fourth time, can be isolated in accordance with a time axis. The above described similarity determination is performed by making effective use of these types of characteristics. Then, for example, at the time of removal, images that are the same as images at the time of insertion can be acquired as images that appear to have been traced back in time, due to having passed through the same location at the time of insertion. This is because if images at the time of insertion are made first time images, there is a possibility of images at the time of removal being classified as being different to the second time images, as the same first time images.

In addition, from other viewpoints also, classification of images is possible, and as similar images unique to images obtained with an endoscope, there are images of a lesioned part (affected part) such as a tumor. For a lesioned part (affected part) such as a tumor there are conditions such as a physician or the like performing magnified observation of the same location, and performing special observation by changing wavelength of the light source or changing image processing characteristics. These images are also all classified as the second time images, for example, and may be treated as similar images. At this time, images are handled by making one set for before and after magnification, and making one set depending on whether or not there is special observation (special light observation) etc., and images that have been put into these sets may be differentiated as the second time images to the first time images. As has been described above, an examination video is evidence that records an examination procedure that changes from moment to moment, and can be easily managed as a sequence of still picture frames classified by time axis.

Therefore, a first time is while a physician or the like operates an endoscope etc., and moves the endoscope to a target position in the body. This case, for example, is a time with no training data candidates, in a case where an inference model for detecting what kind of tumor there is in an affected part has been assumed, and so corresponds to a time when a physician or the like is accessing the affected part etc. Here, description will be given with this type of case as an example (refer to images Ps in FIG. 3B). Images that can be acquired at this first time are not targets for observation, and in order to access to the affected part skillfully, image quality is good enough that it can be understood that the tip end of the endoscope is being fed into the body without damaging any internal organs. Image acquisition may continue without keeping up with the endoscope insertion operation, and there may be blurred images, resulting in low image quality. For this reason, the image quality is not appropriate for creating inference models that observe and differentiate, and they are made unnecessary images and not stored (refer to S3 in FIG. 3A).

In the case of an inference model that has been obtained by learning training data that has been acquired by performing annotation in some frame of continuous images, it is necessary to have a process to find training data candidates from among many frames, and a tremendous burden is imposed. However, with this embodiment, if there are conditions such as creating an inference model of specification similar to preexisting exemplary, image frames that are not objects of annotation, among original continuous images at the time training data was created at the time of creating the exemplary inference model, are taken into consideration. Image candidates that are not targets are then removed from continuous images that have been newly obtained, and training data can then be simply created by determining annotation candidate images from the remaining frames. In this way, images of low importance are determined by reflecting the effect of having chosen them in accordance with time from among a stream of images (image group that was obtained in time series) such as a video etc. at the time an inference model of exemplary specification was created. As has been described above, in a learning method, learning system, or program that includes this type of step, it is possible to utilize know how such as training data selection at the time of the exemplary inference model creation.

However, in the case of an application (specification) for creating an inference model for safe insertion guidance, there are cases where images that have been removed due to rather low importance become important, and should be stored. In that case, processing is similarly performed based on the way of thinking for unnecessary images (images of low priority). That is, at the time that an existing inference model of similar specification was created, images that were not subject for annotation may be made unnecessary images.

On the other hand, the second time is a time when a physician operates an endoscope or the like in order to observe and distinguish for physical object confirmation, in the vicinity of a part of interest in the body. The second time is a time when the tip end of the endoscope is gently moved and bent, and careful examination is performed (refer to images Po in FIG. 3B). At this second time, while moving dirt with water and by suction, the physician or the like gently moves and bends the tip end of the endoscope, and changes image quality, enlarges the image, manipulates the affected part, changes angle for confirmation, performs specialized observation, and performs staining and florescence observation. Images acquired in this second time are in the vicinity of the target position, the same area is continuously captured within the image, there is little blurring, and there are many high quality images that are in focus. Images that have been acquired at this time have a possibility of at least being determined as images that were obtained at a time that is different to the first time a short while before.

Figure 3A:
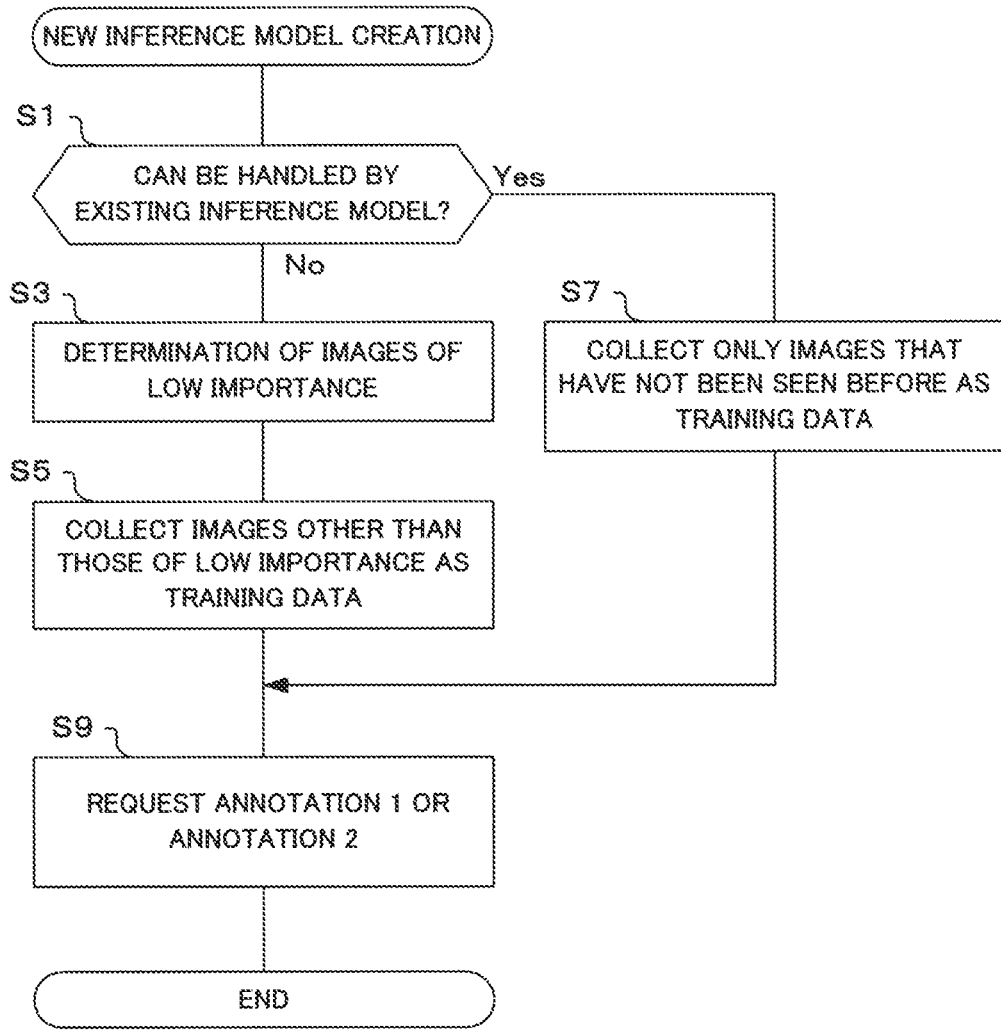
FIG. 3A is a flow chart showing operation of new inference model creation.
Figure 3B:
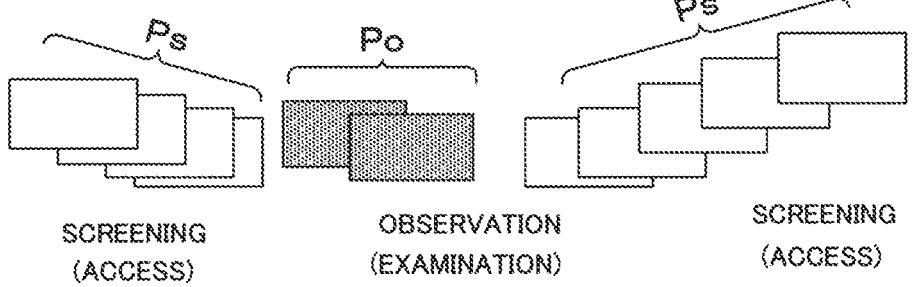
FIG. 3B is a drawing showing an example of input images.
Figure 5A:
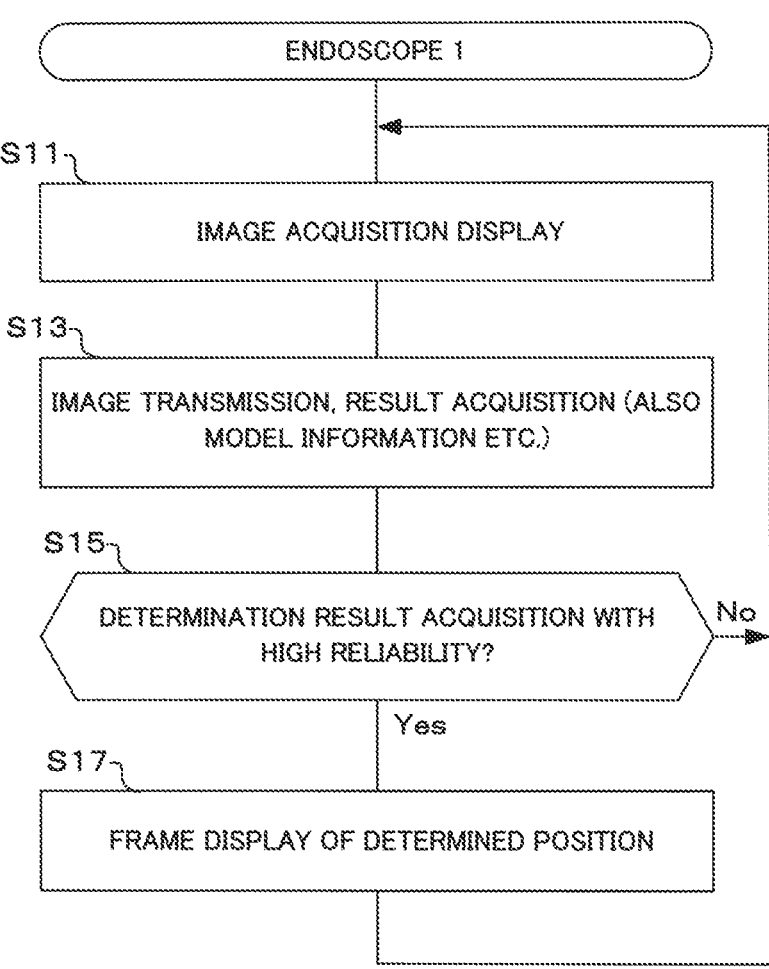
FIG. 5A is a flowchart showing operation of an endoscope 1.
Figure 5B:
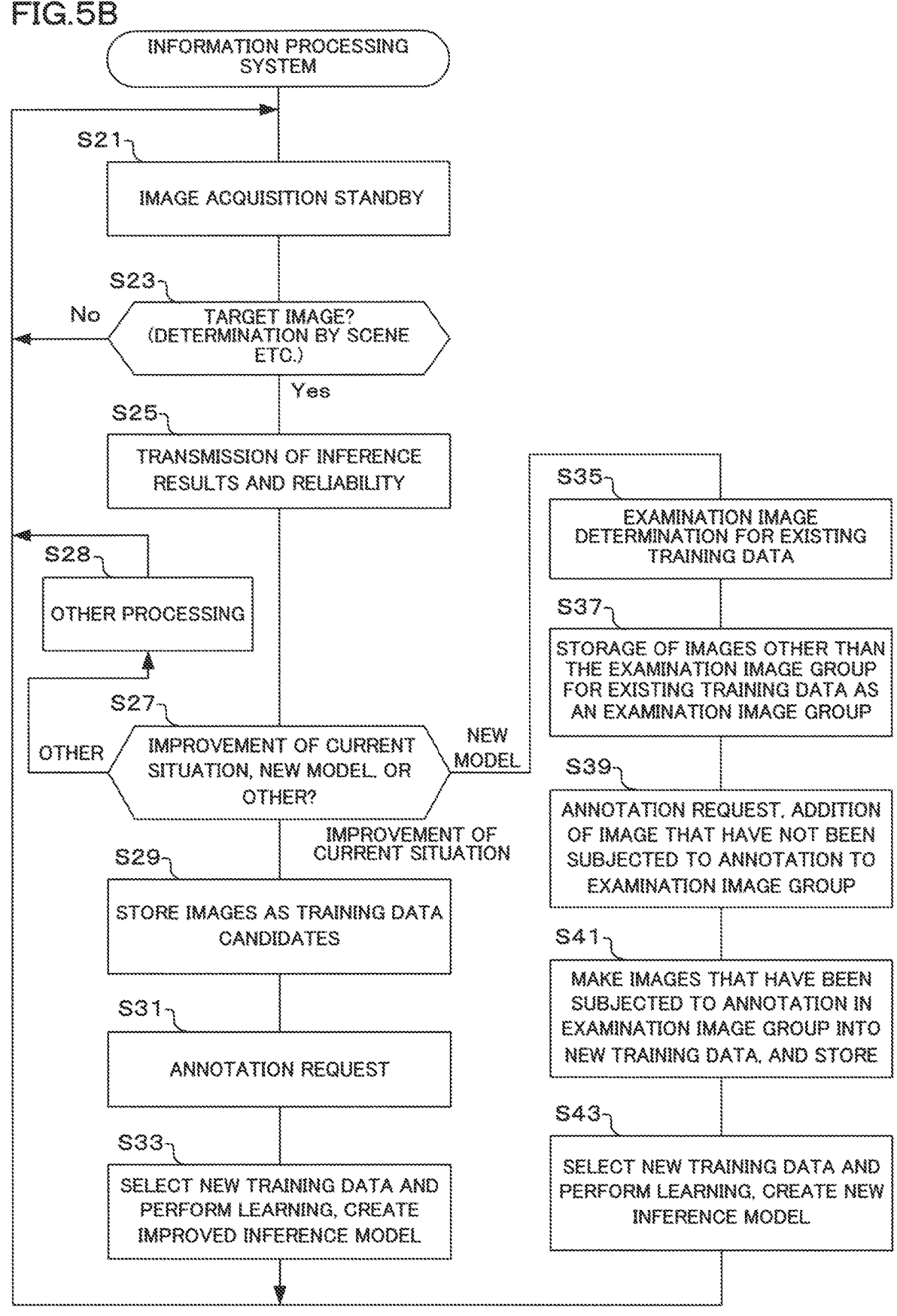
FIG. 5B is a flowchart showing operation of the information processing system.

Images that were acquired at the above described first time and images that were acquired at the second time are divided into groups in accordance with the time of image shooting, and stored in the storage section 30 as first images or second images (refer to S5 and S7 in FIG. 3A, and S35, S37 and S29 in FIG. 5B). Obviously, it cannot be said that the images are divided clearly at a time point, and so there may also be cases where frames between groups cannot be correctly grouped. However, in applications such as finding training data candidates from a large number of image frames, grouping is usually not a problem. Even in cases where the grouping is inappropriate, it is sufficiently possible to correct the grouping in the process of making training data. For example, when a specific frame of the second image has been made training data, a frame similar to that may be determined from the first image by similar image search, taken out, and reclassified as a second image. The first image is a simplified representation of the first time image stored in the first time image section 31c, and the second image is a simplified representation of the second time image stored in the second time image section 31d.

As described above, based on degree of similarity of images, the image similarity determination section 13 determines whether an input image is similar to first time images stored in the first time image section 31c, or similar to second time images stored in the second time image section 31d. At the time of creating an existing inference model, which data became or did not become training data, and whether that data became annotation data or not, are stored in the first time image section 31c and the second time image section 31d. Therefore, if the images stored here are used, they will constitute evidence of what kind of data was adopted as training data and learned, and for new inference models in the future, images acquired newly can be classified using and considering the stored images. When creating an inference model for an existing endoscope, first time images and second time images are stored each in the first time image section 31c and the second time image section 31d. After that, the information processing system 10 may be input with images from various endoscopes (refer, for example, to input images PI1-PI3 in FIG. 2). At the time of creating an inference model having a similar specification, every time these images are input, the image similarity determination section 13 determines whether or not those images are similar to the first time images or the second time images storing they became or did not become training data and became annotation data or not. The determination results are sent to the classification section 15.

The metadata attachment section 14 attaches metadata to image data. As will be described later, category information 31*a* and specification information 31*b* are associated with the image data (first time images, second time images) of the examination image group at the time of existing training data creation 31, as metadata. The category information 31*a* is, for example, endoscope manufacturer information, and shows the image sensor and optical characteristics, and the characteristics of the image processing circuit, of the endoscope used as the image system 20. At the time of creating an inference model, images are collected for each manufacturer and model of endoscope, training data is created, and an inference model is created using this training data. This is because even for an inference model that is suitable for a particular model or the like, the reliability of inference may be low for other models of endoscope and the like. Category information 31*a* is therefore associated with the images. The specification information 31*b* is information on the specification of the inference model when the first inference model (existing inference model) was created using the image file 31A. Specification information includes various information relating to the inference model, such as what kind of image was used when creating the inference model, and the structure of the inference model. The metadata attachment section 14 functions as an appending section (appending processor) that appends metadata to individual images constituting an image group.

In the case of a system that has utilized the existing inference model 19*a*, it is preferably made possible to establish what training data that inference model was learned with, there is also a request for historical transparency, and the inference model and this information is stored in this storage section 30. For the image file stored in the storage section 30 it is also assumed that an image group (for example, a video obtained by a specific endoscope examination) obtained in time series was the source of the training data. What kind of device the image was obtained from, what was imaged, the date and time of shooting, etc. can be managed with metadata as category information 31*a*. Metadata indicating what kind of inference model was created from this image may also be stored in the storage section 30. In FIG. 1A and FIG. 1B, the specification information 31*b* of that inference model 19*a* is described, but a plurality of inference models may be created from the same images. It may also be possible to store which part (frame) of that image group constituted training data.

In this specification, description has been simplified to make it easy to understand, with it being possible to store the information of the first time image and the second time image in the first time image section 31*c* and the second time image section 31*d*. As well as this, images may be divided depending on whether or not they become training data candidates, images that actually became training data may be made second time images, and it may be made possible to specify elapsed time from the beginning of a video (image group obtained in time series) and the number of frames, etc. Also, this may be managed by attaching flags etc. to image frames. Instead of training data candidates, what images became training data may be classified and recorded. These images can be made second time images, and may be further separately classified as third time images.

In this embodiment, the features of frames constituting an image group that was obtained in time series, such as a video, have been classified into a first time and a second time, in order to indicate that they can be stored by dividing into at least two, that is, a plurality. Also, it is not absolutely necessary to adopt images that have been subjected to annotation as training data. However, if an image that has been subjected to the laborious work of annotation has a certain degree of importance, and if it can be distinguished, it can be used and referred to when creating other inference models. It should be noted that in FIG. 1B, it looks as if only a single item of inference model information can be entered in the image file, but it may be possible to have a plurality of inference models from the same images. At that time, information may be stored by accordingly separately arranging the first time image section 31*c* and the second time image section 31*d*.

It should be noted that when the category information Pc is assigned to an input image in the image system 20, that category information Pc may be applied as the category information 31*a*. Also, in a case where category information Pc has not been associated with the input images, the input determination section 12 may attach category information 31*a* by taking into consideration various information, such as unit type of the image system 20, image quality (optical specifications), condition of image illumination, image angle of view, image shape etc. Also, category information 31*a* may be determined and assigned based on shape etc. of surgical tools depicted together within an image, and, if there is a video, operating status etc. Also, in FIG. 1B, specification information 31*b* is only assigned to the image file 31A of the examination image group at the time of existing training data creation 31, but when an inference model has been created using the examination image group 32, the specification information of that inference model may be stored.

The classification section 15 performs classification of the input image into a first time image or a second time image based on a determination result in the image similarity determination section 13. In accordance with the result of this classification, category information 32*a* to the effect that the input image is a first time image or a second time image is added. The first time image may be used when generating a second inference model for an unknown endoscope (endoscope of unknown origin), which is not well known in the market.

The classification section 15 functions as a classification section (classification processor) that classifies an image group constituting training data candidates, within a newly acquired image group from the first or second endoscope, using an image group that was obtained at the first time when the first inference model was created (refer, for example, to S35, S37, etc. in FIG. 5B). Using training data based on an image group that was obtained in time series by the first endoscope, the classification section 15 makes images, that were not subjected to annotation at the time an existing inference model having the same or similar specifications was created, unnecessary images (for example, refer to image Plo etc. in FIG. 2). Further, the classification section 15 functions as a classification section that classifies an examination image group that was obtained from a second endoscope that is different from the first endoscope, by including and using an image group that was not used as training data when the first inference model was created (refer, for example, S35, S37, etc. in FIG. 5B).

Also, the classification section 15 uses features of the image group that was obtained at the first time when the first inference model was created, to classify an image group that has been acquired from a second endoscope that is different to the first endoscope (existing endoscope, endoscope manufactured by a specific manufacturer). That is, the classification section 15 uses the image group that was obtained at the first time when the first inference model was created, and determines the features of this image group (for example, differences in features between the first time image group and the second time image group). Images that have been acquired from the second endoscope that is different to the first endoscope are then divided in time, and with performance, such as image quality for the same specification, is compared to find differences between features of the first images and the second images, and then annotation candidate images are classified from among all image frames of the examination image group at the time of creation of the existing training data.

By including and using an image group that was not used as training data, of the images at the time the first inference model was created, the classification section 15 determines features of those. The classification section 15 therefore functions as a classification section (classification processor) that classifies as annotation candidate images from among images that have been obtained from a second endoscope that is different from the first endoscope (refer, for example to S35, S37 etc. in FIG. 5B). It should be noted that the second time is determined according to the input/output relationship (specification of the inference model) that the inference model is required for.

The storage control section 18A performs storage control for storage, into the storage section 30, of images that have been determined by the input determination section 12, that have been subjected to similarity determination by the image similarity determination section 13, have had metadata assigned by the metadata attachment section 14, and have been classified by the classification section 15. In controlling storage to the storage section 30, an image group that was input at the time of creating the existing training data is stored in the examination image group at the time of existing training data creation 31, and after creation of the existing training data, the image group that was input at the time of normal examination is stored in the examination image group 32. It should be noted that since the number of existing inference models that used existing training data is not limited may be many, a plurality of image files 31A are stored in the examination image group at the time of existing training data creation 31 in accordance with respective existing inference models. Although it appears that there is only one image file 31A in FIG. 1B, a large number of image files are stored.

In this way, a new examination image is stored in the examination image group 32 for a medical examination and its evidence, and the image file group 31A of the examination image group at the time of existing training data creation 31 is also recorded (if collaboration is possible, it is not necessary to be exactly the same memory). As a result, by comparing these images, it is easy to determine what kind of image was captured at what time, and what kind of event occurred, and the like, for the image (video) of the examination image group 32. This idea will be shown later as an example of inference in FIG. 8A and FIG. 8B. Thus, the newly acquired and recorded image group can be easily classified by time.

The first request section 16 requests creation of an inference model, using a second time image group, acquired at the second time, stored in the second time image section 31d of the examination image group at the time of existing training data creation 31, to the learning section 18.

This inference model is used as an existing inference model 19a. Also, after generating the existing inference model 19a, when an endoscope image has been input using the first endoscope (existing endoscope, endoscope manufactured by a specific manufacturer), if there is a rare image that has never seen before the first request section 16 requests generation of an improved inference model using this image, to the learning section 18 (refer, for example, to S7 in FIG. 3A, and S27-S33 in FIG. 5B, etc.). The first request section 16 functions as a first request section (first request processor) that requests annotation, on an image group, for training data in order to generate a third inference model that is an improvement on the first inference model, according to the reliability of the result of having performed inference of the same image with the first inference model (refer to S7 in FIG. 4A and FIG. 3A, S107 and S109 in FIG. 3C, and S27-S33 in FIG. 5B).

The first request section 16 for requesting creation of an existing inference model need not necessarily be provided within this system. However, this first request section has a proven record of having created an existing inference model by selecting training data, has some cooperation with the information processing system 10, and the result of the training data selection is stored as the examination image group at the time of existing training data creation 31. For this reason illustration is given to clarify that this first request section performs control such as what type of image has been selected as training data at that time.

The second request section 17 requests creation of an inference model using images that are suitable for generating an inference model for a second endoscope from the images 32b stored in the examination image group 32, to the learning section 18. As will be described later, image data that was acquired when performing endoscopic examination with the first endoscope (existing endoscope, endoscope manufactured by a specific manufacturer) or the second endoscope, after the existing inference model was created, is stored in the examination image group 32. Among these image data, annotation is attached to the image data that was acquired by the second endoscope and used as training data. The inference model that was generated as a result of the request to this second request section 17 is an inference model used when a physician or the like performs examination using a second endoscope. This inference model may be set in the inference engine 19 in the image system 20 as a second inference model.

The second request section 17 functions as a second request section (second request processor) that classifies an image group that has been acquired from the second endoscope and has been classified as images for generation of an inference model for the second endoscope, and also requests annotation on the classified image group in order to obtain an inference model corresponding to images that have been obtained by the second endoscope, while having the same or similar specifications as the first inference model (refer to S43 in FIG. 5B). The first request section 16 and/or the second request section 17 function as a selection section for selecting new training data candidates according to a classified image group stored in the storage section, from a new examination video (refer, for example, to S93 etc. in FIG. 7). Also, the second request section 17 functions as a second request section that requests learning with the results of having performed annotation on the examination image group as training data and generating of a second inference model (refer, for example, to S27-S33 in FIG. 5B).

The learning section 18 receives requests from the first request section 16 and the second request section 17 and generates an inference model. The learning section 18 has an inference engine, inputs the training data, and sets weighting of the neurons in the intermediate layer so that the inference result is the same as the annotated result.

Here, deep learning will be described. "deep learning" is the processes of "machine learning" that uses a neural network formed as a multilayer structure. A "feed-forward neural network", which performs determination by sending information from the front to the back is typical. A feed-forward neural network, in its simplest form, would have three layers, namely an input layer comprising N1 neurons, an intermediate layer comprising N2 neurons that are provided with parameters, and an output later comprising N3 neurons corresponding to a number of classes to be determined. It is possible to easily form a logic gate that each neuron of the input layer and the intermediate layer, and of the intermediate layer and the output layer, are respectively connected with connection weights, and bias values are added to connections of the intermediate layer and the output layer.

While a neural network may have three layers if it is to perform simple determination, by providing many intermediate layers it becomes possible to learn how a plurality of feature amounts are combined in processes of machine learning. In recent years, neural networks having from 9 to 152 layers have become practical, from the view point of time taken in learning, determination precision, and energy consumption. Also, a "convolution type neural network" that compresses feature amounts of images, performs processing called "convolution", operates with minimal processing, and is strong at pattern recognition, may be used. It is also possible to use a "recurrent neural network" (or a fully connected recurrent neural network) that handles more complex information, and in which information flows bidirectionally in accordance with information analysis in which implication is changed in accordance with order and sequence.

In order to implement these techniques, a conventional generic computational processing circuit, may be used, such as a CPU or FPGA (Field Programmable Gate Array). However, this is not limiting, and since most processing in a neural network is matrix multiplication it is also possible to use a processor called a GPU (graphic processing unit) or a tensor processing unit (TPU), which specialize in matrix calculations. In recent years there have also been cases where a "neural network processing unit" (NPU) which is dedicated hardware for this type of artificial intelligence (AI) has been designed capable of being incorporated by integrating together with other circuits, such as a CPU, to constitute part of the processing circuitry.

Besides these dedicated processors, as approaches to machine learning there are also, for example, methods called support vector machines and support vector regression. The learning here is calculation of discriminator weights, filter coefficients and offsets, and as well as this is a method that uses logistic regression processing. In a case where something is determined in a machine, it is necessary for a human to teach the machine how to make the determination. With this embodiment, image determination adopts a method of calculation using machine learning, but besides machine learning it is also possible to use a rule based method that adapts rules that have been acquired by a human by means of experimental rule and heuristics.

The learning section 18 can also be used when generating an existing inference model. When generating an existing inference model, the learning section performs annotation on the image group obtained at the second time, among images obtained in time series by the first endoscope, in order to perform specific image feature determination on images successively obtained from the first endoscope. A first inference model is then generated for image feature determination of the first endoscope images, by learning with results of having performed annotation as training data. It is assumed here that images during access are classified as the image group that was acquired at the first time, and the image group that was obtained at the second time is classified as images at the time of confirmation of a tumor or the like. Annotation on an image in which a tumor or the like has been confirmed, may be annotation of results of differentiating where in the image frame that tumor is, and what kind of tumor it is. By learning using these image frames that have already been subjected to annotation, an existing inference model can be generated. The specification of this existing inference model can be written as tumor differentiation. Although it has been said before, there may be learning for creation of inference models of other specifications, but at that time, image group isolation method and the contents of annotation are different.

Therefore, the learning section (learning device) that generates the existing inference model in this embodiment determines whether an image group that has been obtained in time series by the first endoscope is an image group that was obtained at a first time (images during access) or an image group that was obtained as a second time (images that were obtained at a time when a tumor or the like was being searched for), and generates a first inference model for image feature determination of images for the first endoscope that was learned with results of having performed annotation on an image group that was obtained at the second time as training data, in order to determine a specific image feature in the images that have been continuously obtained from the first endoscope. In this embodiment, the learning section 18 is provided in the information processing system 10, but the learning section for generating an existing inference model need not be provided inside the information processing system 10, and a learning section can be arranged externally, for example, and this learning section and the information processing system 10 may act in cooperation.

Figure 7:
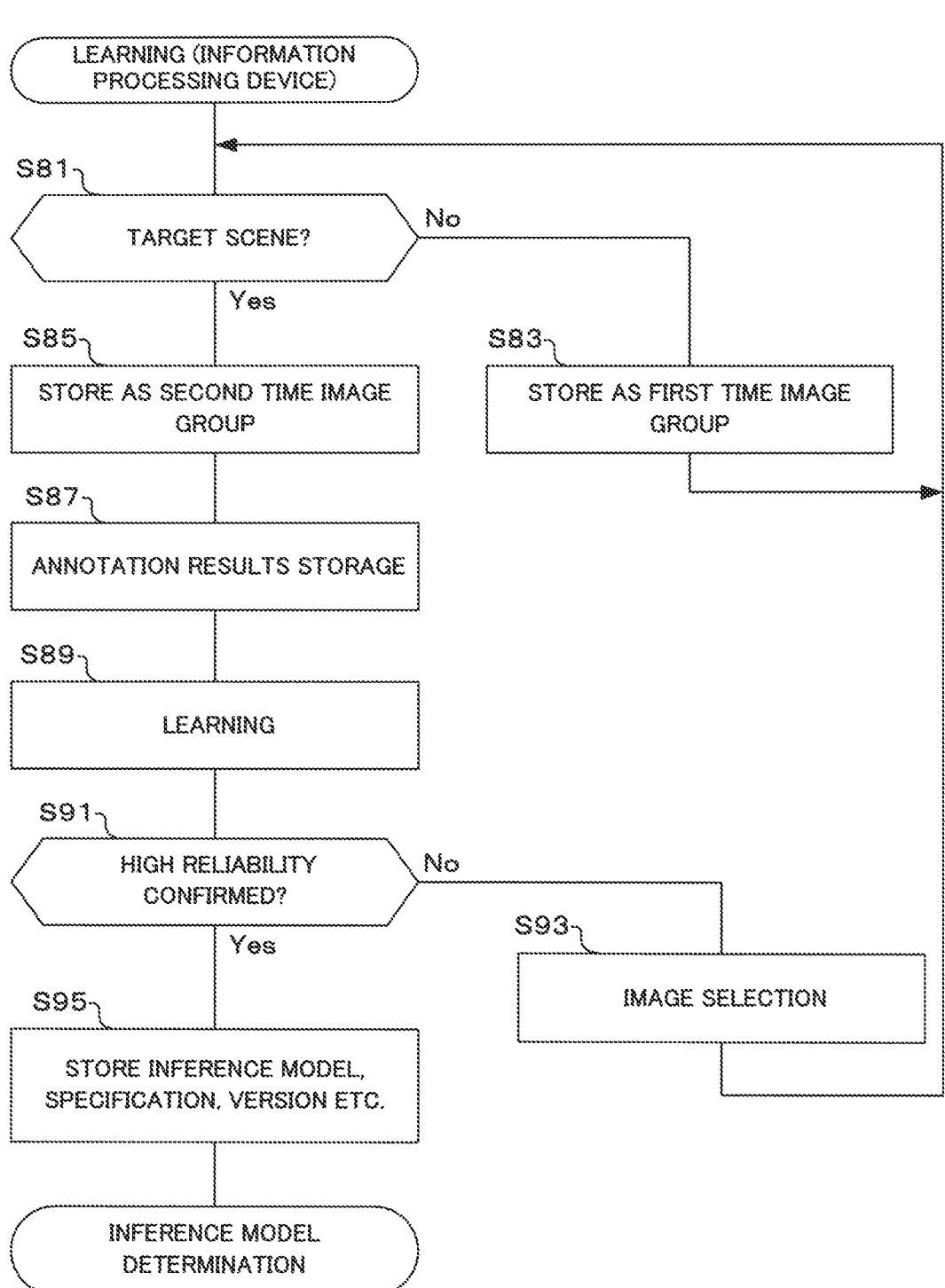
FIG. 7 is a flowchart showing operation of a learning device in the information processing system of the one embodiment of the present invention, and its peripheral systems.

The learning section 18 makes images that have been selected from the image group constituting training data candidates by the classification section into training data, and generates a second inference model corresponding to images that have been acquired by the second endoscope, and having the same or similar specifications as the first inference model (refer, for example, to S89 in FIG. 7). It is assumed that the second inference model generated here has the same or similar specifications as the existing inference model, and that specification is set in the inference engine 19. If the existing inference model infers a lesioned part such as a tumor, an inference model having the same or similar specifications as for performing inference of a lesioned part such as a tumor for an image acquired from the second endoscope becomes the second inference model. In the case of similar specifications as described above, the classification of images that have already been used for learning the first inference model serve as a reference.

Also, the learning section 18 functions as a learning section that creates a first inference model for the endoscope by learning with the image group included in the examination video obtained from the endoscope as training data. The learning section 18 functions as a learning section that generates a first inference model for image feature determination of the first endoscope images that has been learned with results of having performed annotation on the first image group that was obtained using the first endoscope, as training data, in order to perform specific image feature determination on images successively obtained from the first endoscope. It should be noted that the first inference model is an inference model for displaying inference results for images that have been obtained using an endoscope.

The existing inference model 19a is set in the inference engine 19, but in this example, description will be given assuming that the inference model is for differentiating what a lesion is. The image system 20 transmits images (P1-P3, SP, etc.) that were acquired by the image acquisition section 23 to the information processing system 10 (refer, for example, to S13 in FIG. 5A). If the inference engine 19 is input with images, it infers whether or not there is a lesioned part such as a tumor, the location of that tumor, and the like, and transmits the inference result to the image system 20 (refer, for example, to S25 in FIG. 5B). The image system 20 outputs the received inference result 25a and the reliability 25b included in the inference results to the display section 24. The inference engine 19 functions as an inference engine in which has been set a first inference model for image feature determination of the first endoscope images, that has been learned with results of having performed annotation on an examination image group for existing training data that was obtained using the first endoscope, as training data, for performing specific image feature determination on images that have been obtained from the first endoscope.

Next, description will be given for the storage section 30 shown in FIG. 1B. The storage section 30 may be provided inside a server or the like in which the information processing system 10 is provided, or may be provided inside a server or the like outside the information processing system 10. The storage section 30 is an electrically rewritable non-volatile memory capable of storing a large amount of image data. The storage section 30 is capable of storing an examination image group at the time of existing training data creation 31 that was used when creating existing training data, an examination image group 32 input from various endoscopes after creating existing training data, and new inference model creation specification information 33.

The examination image group at the time of existing training data creation 31 stores image data at the time images were collected in order to generate an inference model suitable for an existing endoscope. As described previously, a physician or the like performs an examination using an existing endoscope (first endoscope), and the image data acquired at this time and used to create the existing training data is stored in the storage section 30 as an examination image group at the time of creating the existing training data. In creating this existing training data, the second time image acquired at the second time, that is, when the physician or the like finds the affected part is used. However, at the time of examination, as described above, after inserting the endoscope into the body and finding the affected part, until the endoscope is removed from the body, that is, at times other than at the second time, images at the first time can also be acquired together. The first time images should be similar images to the images stored in the first time image section 31c of the examination image group at the time of existing training data creation 31. Therefore, if new endoscope images are input, they are managed as first time images by referencing the first time images.

When creating an inference model for an existing endoscope, this created inference model is not limited to being a single inference model, and a plurality of inference models may be created in accordance with various applications and models. For this reason, each time the image acquisition section 23 acquires image data (including image data groups), the information processing system 10 generates an image file 31A. A plurality of image files 31A are stored in the examination image group at the time of existing training data creation 31. Each image file 31A includes category information 31a, specification information 31b, a first time image section 31c, and a second time image section 31d. The first time image stored in the first time image section 31c corresponds to image data such as images Plo, Pna, and Pad1-Pad3 (refer to FIG. 2) acquired by the image system 20.

The examination image group 32 stores image data that was acquired when endoscopic examination was performed with the first endoscope (existing endoscope, endoscope manufactured by a specific manufacturer) or the second endoscope, after the images were collected in order to create existing training data. As was described previously, the information processing system 10 may be input with images from an unknown endoscope other than the existing endoscope (refer, for example, to image PI3 in FIG. 2), and further, images may be input using an existing endoscope. The examination image group 32 corresponds to such images. A new inference model is generated using this examination image group 32. In addition, there are images that are rarely seen, even with an existing endoscope, and the examination image group 32 in this case is used to improve the existing inference model. For this reason, various information is associated with the image data that has been acquired by the information processing system 10, and stored in the storage section 30 as the examination image group 32.

As will be described later, the new inference model creation specification information 33 is information relating to a specification for creating an inference model, when an inference model is created using the image data of the examination image group 32. When creating an inference model, specifications such as specifications related to population of the training data and defining of the configuration of the inference model are required. Also, when improving the existing inference model, the specification information of the additional training data is stored in the additional training data specification 33a.

It is desirable for information on specifications such as with what kind of device was there what kind of input, and what kind of output, to be correctly managed using this type of storage. The specifications of each inference model and the training data used at that time are managed using this information. What kind of inference was made using what inference model is therefore stored as evidence information, for example, and if this information is attached to an image, it can be easily referenced. New inference models and improved inference models are preferably correctly verified as to whether their performances are the same or superior to existing inference models. If something that can be distinguished by the existing model becomes impossible, it cannot be said to be an upgrade, so it is desirable for information such as these report items and performance limits to also be correctly managed in the storage region. If there are any problems, it is possible to refer to this storage region. Obviously, information on existing inference models may also be stored here.

Figure 2:
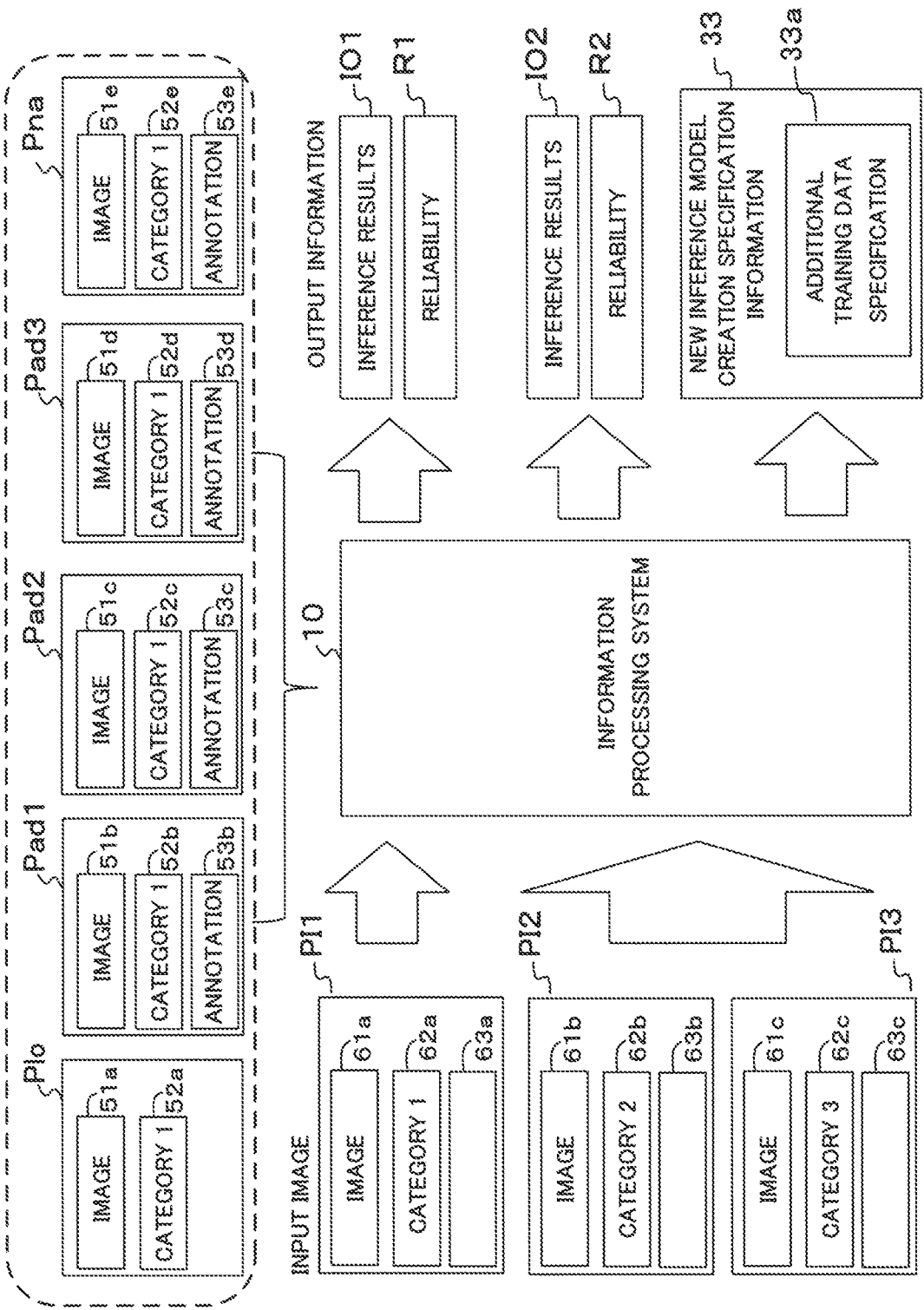
FIG. 2 is a drawing showing a relationship between image data and generation of an inference model, in the information processing system of the one embodiment of the present invention and its peripheral systems.

As has been described above, the storage section (memory) 30 stores an image group that was acquired at the first time and an image group obtained at the second time for creating a first inference model (for example, refer to images Plo, Pad1-Pad3, Pna, etc. in FIG. 2). That is, not only the image group obtained at the second time for creating the first inference model (existing inference model), but also images obtained at the first time are also stored. Also, the storage section 30 functions as a storage section that stores at least a part of the examination video together with the results of classifying an image group at the time the training data was selected from the image frames included in the examination video, with time information of the video frames (for example, S35, S37, etc. in FIG. 5B). In this embodiment, when acquiring examination images for training data, the first time and the second time are determined, and the image data is stored based on the result of this determination. In the storage section 30 shown in FIG. 1B, when storing the examination image group 32, it may be determined whether the images are for the first or the second times, and the time information may be recorded together with the examination image group 32. It should be noted that at least a part of the above-described examination video includes annotation candidate images.

Next, the collection of images and the generation of an inference model using these images, in the information processing system of the one embodiment of the present invention, and its peripheral systems, will be described using FIG. 2. As described previously, the information processing system 10 of this embodiment can be connected to various endoscope devices (image processing system 20), and so various image data is transmitted. Besides the existing inference model, the information processing system 10 can generate an improved inference model or a new inference model using this various of image data. An improved inference model is an improvement on an existing inference model that existed previously. Also, a new inference model may be a completely new type, and may an inference model that makes it possible to perform accurate inference even in the case where image data having a different image quality to previous image quality has been input. This new inference model is generated using the examination image group 32 stored in the storage section 30.

In FIG. 2, images Plo, Pad1-Pad3, and Pna are images that will be subject of consideration or were subjects of consideration when the information processing system 10 creates an existing inference model 19*a*. These images have a proven record of having been used when an existing inference model (specific inference model) was created, and have had their history managed. If it is concluded that the inference model is proven, it is organized by including very important information.

Although omitted in FIG. 2, the information processing system 10 includes the existing inference model 19*a* shown in FIG. 1A, the input determination section 12 shown in FIG. 1B, the image similarity determination section 13, the metadata attachment section 14, the classification section 15, the first request section 16, the second request section 17, the learning section 18, and the storage control section 18A.

The information processing system 10 first generates an existing inference model 19*a* (refer to FIG. 1A) based on the input images. That is, If the input images Plo, Pad1-Pad3, and Pna (FIG. 2) are input, the input determination section 12 determines that the images that were acquired by an endoscope manufactured by a specific manufacturer based on information such as category 1 of the image. Then, the information processing system 10 eliminates the image Plo having a low degree of importance among the input images, rejects the image Pna for some reason, and requests the attachment of annotation indicating position of a tumor or the like to the images of the input images Pad1-Pad3, and creates training data. Using training data based on an image group that was obtained in time series by the first endoscope, the information processing system 10 makes images, that were not subjected to annotation at the time an existing inference model was created, unnecessary images. If the training data has been created, the learning section 18 generates an existing inference model 19*a* using this training data.

In this way, the image group (images Plo, Pad1~Pad3, Pna, etc.) that has been organized and used is valuable know-how information, and includes results that have been obtained through trial and error, such as what kind of image was annotated and made into training data, and what kind of image was not used as training data even though it was subjected to annotation. That is, determination as to whether or not images might be new training data candidates is possible using images that have not been used so far, and even if only images that are similar to images that were not used are collected, with this system determination becomes possible even if those images are not at all useful. Besides images that should not be used, however, it is possible to include new information, and in order to increase effort, it is better to carefully examine images other than those that should not be used (the first time image, so to speak). In this embodiment, this concept is used to efficiently collect images.

In the following, the generation of the existing inference model 19*a* will be specifically described. Image Plo is an image of low importance, images Pad1~Pad3 are images that have been made existing training data that has a record of having been used, and image Pna is an image that was created as existing training data but has no record of having been used. These images Plo, Pad1-Pad3, and Pna are all images that were acquired with the above-described specific manufacturer's endoscope. The reason the specific manufacturer has been mentioned here is that in general, the image sensor, optical system, image processing, etc. are different for different endoscope manufacturers, and for this reason, if image data acquired by endoscopes of various manufacturers is mixed, the reliability of the inference model decreases. It should be noted that even if the manufacturers are different, if the image sensor, optical system, image processing, etc. are similar, it may be possible to perform inference using the existing inference model using image data within a similar range. Therefore, when creating a specific inference model, the information processing system 10 carefully judges and uses the image data of the endoscope of a specific manufacturer, and generates an inference model 19*a* that has taken the characteristics of the model into careful consideration.

Existing inference models are the result of having generated an inference model using initial attempts, and are often created using training data that was selected by performing various trial and error, by manual input, or visual inspection. Therefore, the logic and know-how in the process of this selection, and the images classified as a result, are intellectual property that contains a wealth of information that is beyond description. As described above, the unused image Plo is an image of low importance, and has image data 51*a* and category information 52*a*. Since the image Plo is an image that was acquired by the previously-described specific manufacturer, the category information 52*a* is category 1. For example, giving an example of creating an inference model for differentiation of lesions, this image Plo is an image that was acquired when a physician or the like was searching for a lesioned part using an endoscope (refer, for example, to image Ps in FIG. 3B). The image being searched is low image quality because the image is blurred because the imaging section is moving, and it is unlikely that the lesioned part will be clearly visible.

There are various specifications for inference models, but here description will continue assuming that inference models have specifications to infer what a lesion is. In this type of case, only a few of the images being searched have been looked at closely for lesions, and an example will be described that is intentionally simplified and priority is lowered. Obviously, if it is an inference model for use that prevents oversight in search images, it is necessary to prioritize search images and make them into training data, but here the description will ignore such cases. Obviously, as long as the image group is organized in accordance with the specification of the inference model, when newly creating an inference model that has placed emphasis on search images, priority should be given to making the image group at the first time into training data.

When it has been determined that an image is a search image, based on features of the captured image, features of image change etc., it may be classified into an image group of a first time that is not necessary when creating an inference model for differentiating. Also, inference is performed as to what kind of frame in the video became training data and images that do not match that result may be classified into an image group of the first timing. As was described previously, the concept of this embodiment is to reference the details of such an image having been rejected at the time generation of the inference model, and use in the subsequent creation of an inference model.

Images Pad1-Pad3 are images that were acquired when a physician or the like carefully examined whether there might be a lesioned part using an endoscope. In the case of an inference model for differentiation, there is a possibility of training data being created from images at the time of examination, and so it is better not to classify images initially as first time images. These images are clear, high quality images in which the imaging section is stationary or only moving slightly, due to the feature of continuously observing the same part. Also, among these images, images having a feature such as a high possibility of a lesioned part being visible are made second time images. At this time, rinse water may be applied, surface dirt may be sucked up, staining may be performed, and the wavelength of light at the time of observation may be changed by changing a light source, while image representation may be changed by image processing, so as to increase visibility of a lesioned part. When initially classifying endoscopic images and creating training data, the second time images are often selected according to an inference model creation manual or the like. However, when creating training data for the second and subsequent times, it is desirable to automate such image classification that was performed manually. Therefore, in this embodiment, the idea of referring to the history of having converted the initially acquired images into training data and using the training data in the subsequent creation of an inference model, is adopted.

Image Pna is an image that was not adopted as existing training data. The category information 52e of this image Pna belongs to category 1 because it is an image that was acquired by an endoscope made by a specific manufacturer, and the image quality is of usable level, and annotation related to position of the lesioned part such as a tumor is attached. However, for some reason, the image Pna is rejected when generating the existing inference model 19a. The reason is, for example, that if an inference model is generated using this image Pna, there may have been cases where the reliability was lowered, and so it was excluded. The possibility of such images being treated as a high priority is low, even if similar images are obtained in the future. If necessary, it may be made possible to classify such images as first time images.

Thus, the images Plo, Pad1-Pad3, and Pna are images that were acquired using an endoscope made by a specific manufacturer, and the information processing system 10 performs deep learning and generates an existing inference model 19a using the images Pad1-Pad3 among these images. It should be noted that in FIG. 2, only one image Plo with a low degree of importance is described, only three images Pad1-Pad3 of existing training data that have been adopted are described, and only one image Pna of existing training data that has not been adopted is described. However, it goes without saying that a larger number of images these images are actually used.

As described above, in this embodiment, each image that has been collected and organized for a proven inference model can be used at the time of improvement of this inference model or for new creation of an inference model for another model of endoscope sufficiently. As to whether or not an inference model has a proven record, in order to solve problems of AI transparency in the future, it is necessary to clearly indicate the basis of inference in the inference results, and it is necessary to make this basis visible. Also, in order to ensure transparency, training data at the time of learning this proven inference model needs to be disclosed as necessary, and this is also required to be made visible.

As described above, if the existing inference model 19a is generated using Pad1-Pad3, the image system 20 inputs the endoscopic images P1-P3, and SP using the existing inference model 19a, and can determine the presence or absence of a tumor or the like. If such an inference model cannot obtain the originally intended performance, the learning may be performed again.

If the images Pad1-Pad3 are selected through a lot of troublesome trial and error, and the existing inference model 19a is generated, the information processing system 10 then inputs image data 51b, 51c, and 51d from various endoscope devices. Category 1 is associated with each image data as category information 52b, 52c, and 52d, and annotation information 53b, 53c, and 53d is attached to each item of image data. As annotation information 53b, 53c, and 53d, position of the lesioned part such as a tumor is assigned.

In the input image PI1 in FIG. 2, since the category information 62a is category 1 and is an existing endoscope, it can be inferred whether or not there is a lesioned part such as a tumor using the existing inference model 19a. For example, each image frame is input to the inference model in real time from the beginning to the end of endoscopic examination, and if a frame in which an affected part has been identified is detected, a frame showing a lesioned part and/or a warning, etc. are performed, and correct differentiation is possible. When this inference has been performed, the inference result IO1 and the reliability R1 at the time of inference are output. Further, for images for which differentiation has been requested by a physician inputting specific still images, the identification result may be displayed in the same way as for the case of a video.

The input image PI2 is an image that has been acquired using an endoscope that is made by a different manufacturer from the existing endoscope manufacturer, or has been obtained from an endoscope that is made by the manufacturer of an existing endoscope manufacture but is a different model. There is a possibility that inference for the input image PI2 can be performed using the existing inference model 19a for the input image PI1. Therefore, at this time, each image frame is input to the inference model in real time from the beginning to the end of endoscopic examination, and if a frame in which there has been affected part differentiation is detected, a lesioned part frame display, a warning, etc. are performed, and correct differentiation is possible. Also, for images for which differentiation has been requested by a physician inputting specific still images, the identification result may be displayed in the same way as for the case of a video. Inference as described above is performed on the input image, and the inference result IO2 and the reliability R2 at this time are output. When the reliability is low, since the current inference model is for when there is a lesion that cannot be judged with confidence, images belonging to category 2 are collected and generation of a current state improvement type inference model or a new inference model suitable for category 2 is requested (refer, for example, to S83 and S87 in FIG. 6). The image at this time is stored as the examination image group 32 (see FIG. 1B).

Also, the input image PI3 is an image belonging to category 3, acquired by a completely unknown endoscope that is not known in the market, and is an image having different characteristics from those of the previously acquired image data. For this reason, for example, for the input image PI3 for which each image frame is input to the inference model in real time from the beginning to the end of endoscopic examination, or for which differentiation has been requested by a physician inputting specific still images, there may be cases where it is not possible to output high reliability inference with the existing inference model. Therefore, the previously described second request section 17 described above issues a request for generation of a new inference model. At the time of this request, a new inference model creation specification information 33 is created using the images stored in the examination image group 32, and additional training data specification 33a is included in this new inference model creation specification information 33.

In this way, the image classification know-how (logic at the time of classifying images Plo, Pad1-Pad3, Pna, and feature information of these images, etc.) at the time a proven inference model was created, can be referenced when creating improved inference models and new inference models. If such classification can be performed efficiently for the input images PI2 and PI3, it is possible to instantly narrow down the images for annotation requested by a specialist. Then, if the annotation can be performed quickly, it is possible to improve an inference model that utilized the training data having that annotation result, and to quickly start the learning process of the new inference model.

What steps were taken to accomplish what was described above will be summarized. Originally developed to incorporate an inference model, there is a division step in which the examination video that was obtained from the first endoscope is divided according to time, and this division is tentatively referred to as the first time and second time. There is an image classification step in which frames corresponding to the first time are removed from the training data candidates and frames corresponding to the second time are adopted in the training data candidates, and there is a storage step for classifying and storing the examination video for each division time. These steps were described as processing of images Plo, Pad1-Pad3, and Pna. If the logic at the time of classification, and the feature information etc. of these images, are utilized, then although there is a difference from the first inference model, it is possible to efficiently make images into training data reflecting effective knowledge, when creating a second inference model (improved inference model or a new model) with similar specifications. That is, a step for acquiring a new examination video to be subject to inference by that second inference model, and a selection step for selecting training data candidates for the second inference model by classifying the new examination images with classifications that reflect the above-described image classification result, are provided. This enables rapid inference model development (learning).

It should be noted that there is a step of learning a first inference model for performing inference of the affected part information contained in the frames of the examination video, using at least one of the training data candidates, for the training data at this time, an annotation step may be provided for making the results of having performed annotation on the frames corresponding to the second time into training data candidates. In other words, by learning with the image group included in the examination video obtained from the endoscope as training data, a device and method can be described such that the learning section that created the first inference model for the endoscope can continue to perform further additional learning, improvement learning, etc. That is, if a storage unit is provided that stores an examination video (at least a part of the examination video) together with the result of classifying an image group at the time the training data was selected from the image frames included in the inspection video in advance using the time information of the video frames, this stored content becomes an effective previous asset. That is, there are cases where learning is performed in order to obtain a second inference model having similar specifications, although a version and assumed device are different from the first inference model, such as the learning section performing additional learning. At that time, a video acquisition section that acquires a new examination video and a selection section for efficiently selecting new training data candidates from a new examination video in accordance with a classified image group that has been stored in the storage section, are provided.

In creating this new inference model, it requires a tremendous amount of time to start collecting new images belonging to category 3. Therefore, in this embodiment, as effective use as possible is made of the images that have already been collected by a physician or the like at the time of examination and stored in the storage section 30 as examination image group 32. That is, examination images acquired by a physician or the like at the time of examination are stored, and these images are used (refer, for example, to S28, S29, S37, etc. in FIG. 5B).

The new inference model creation specification information 33 and the additional training data specification 33a are specification information for generating a new inference model for inferring images belonging to category 3. The second request section 17 requests the learning section 18 to generate an inference model, together with these sets of information. An inference model required for an endoscope with what kind of characteristics, and inference required for what kind of affected part image can be determined based on the image data, changes in that image data, image features of whatever is depicted in the taken images, or inference results and reliability from existing inference models.

Next, operation for generation of a new inference model will be described using the flowchart shown in FIG. 3A. However, this new inference model assumes that there is already an inference model with similar specifications, but while it has similar specifications, it will have further improved performance and can be used with other devices. Therefore, an inference model with specific specifications exists as the existing inference model 19a of FIG. 1A, and the flow shown in FIG. 3A, shows operation for generating an inference model that emulates the specifications of the existing inference model as a new inference model. There may be a plurality of the inference engines 19 of FIG. 1A, or there may be a plurality of existing inference models 19a. In this case, there may be a step of selecting an inference model of which among these specifications to newly create. Here, since description has been given for a state where inference is performed with specific expectations for an inference model of the existing specification, the description will continue assuming specification selection has already been made.

The flow of FIG. 3A is realized by the control section 11 in the information processing system 10 controlling each section within the information processing system 10 according to a program stored in the memory. This flow can efficiently acquire training data for generating new inference models from a large number of images.

As described previously, in the following two situations, it is assumed that important training data candidates may be overlooked with simple image judgment and situation judgment. As the first situation, for an endoscope image data group (frame group) other than normal patterns, such as those accompanying rare cases that are completely different to any seen up to now, or unusual procedures, the image frames that can be obtained, and observation and operation methods, are different, and so there is a possibility that they will not be correctly determined and acquired as training data. Also, as the second situation, for an endoscope device that has different ways of being operated and different image quality to the expected endoscope (endoscope for which there is already a proven record of having an inference model created), there is a possibility that it will not be possible to correctly determine and acquire training data. That is, for these cases it is necessary to relax conditions for images to be made into training data as much as possible, so that they are not missed. Therefore, with this embodiment, a method is provided such that for cases where there are only a few previous examples, images are rejected in order of low priority as much as possible so that these cases can be handled effectively, while considering the unexpected. A second inference model with a different version and assumed device from the first inference model but with similar specifications has been described, but the first situation and the second situation here are respectively version upgrades and expansion of assumed equipment, and it is assumed that the specifications are the same or similar. It is assumed that with similar specifications, image frames that it is possible to acquire in similar situations can be made into training data.

The first situation described above having been considered is handling of a case where step S1 in FIG. 3A has branched to Yes. These are images from a known device, but if there are images that have not been obtained before, they are assigned priority in being made into training data candidates as there may be some material for improvement. Also, the second situation described above having been considered is handling of a case where step S1 in FIG. 3A has branched to No. Since this is not a known endoscope, all images may be a "has not been seen" situation, so to speak. However, even with these types of image, when they are used in examination of a specific body part with an endoscope, the processes from insertion into a body cavity, through access, confirmation of the affected part, and removal, ought to be obtained as images. It is therefore possible to effectively utilize determination using logic and inference as to what kind of images are not required at the time of creating an inference model for an endoscope that is known, and what kind of images training data candidates can be obtained from. In other words, first the less important images are removed, and then training data candidates are found from among the remaining images.

If the flow for creating a new inference model is commenced, it is first determined whether or not the existing inference model can handle the current situation (S1). Here, the input determination section 12 is input with image data or the like from the image acquisition section 23 of the image system 20 and determines whether or not it is possible to perform inference using the existing inference model 19a. In this determination, the determination is based on the category information associated with the image data. It should be noted that among the input images in FIG. 2, there may be images belonging to categories 2 and 3 that do not have category information associated with them. In this case, the determination may be made using other information, such as other attached data, information related to image quality, and information related to the shape of the screen. Also, the determination may be based on the reliability of the inference without making a determination based on a category or the like.

If the result of determination in step S1, is that images can be handled by the existing inference model, only images that have not been seen are collected as training data (S7). Since the determination result in step S1 is that images can be handled by the existing inference model, normally the possibility of there being images that have been seen (in other words, images that are similar to images acquired so far, or images whose characteristics are the same as before) is high. This determination can be performed by the image similarity determination section 13 comparing features of these images, if the original endoscope images (video) that were used when creating an already proven inference model are stored (stored as the examination image group at the time of existing training data creation 31). The similarity determination may be performed, and those images above a certain threshold value may be determined to be similar images (images that have been seen).

Also, which part within an image has a proven record that was used as training data when generating an existing inference model is stored, and it becomes possible to similarly determine whether or not it is rare as training data. Images that are determined to be not similar by these determinations can be judged as "images that have not been seen before". For example, with regard to the endoscopic video information that was obtained during a specific examination, video information that was obtained by making frames corresponding to training images within this endoscope videos into annotation information is made into training data. Then, the same creation of training data is further performed for an endoscope video image for a plurality of examination results, and an existing inference model is generated. An endoscope video that includes insertion or removal images is input to this existing inference model, and inference is performed to give an output of frames used as training data. There is a possibility that images that have not been seen before may be missed because there is no record of them having been used as training data so far. Therefore, in this inference, images with medium reliability are selected, similarity determination with endoscope images (or images that have become training data) that have been handled up to now is performed, and images with a low similarity are made rare data (rare images) and made into training data candidates. That is, if an image subjected to determination in step S1 is a rare image that has not been seen before, there is a possibility that it can be used to improve the inference reliability of the existing inference model. Therefore, in this step, images that have been seen before are not collected, and only unique (rare) images that have not been seen are collected, and these images can be used as training data.

Also, when collecting rare images that have not been seen, images that are not normal in a judgment as to whether or not they are normal, and, if it can be considered to be an image of a lesioned part, for which the reliability of that judgment is not high, may be collected as images that have not been seen. Here, the collected images are stored in the storage section 30 as an examination image group 32. At the time of this storage, metadata indicating that it is a rare image that has not been seen is attached. A specific example of a method for determining whether or not an image is a rare image that has not been seen will be described later with reference to FIG. 4A.

Next, a case where it is determined in the determination of step S1 that the situation cannot be handled with the existing inference model will be described. For example, for endoscopic video information that was obtained at the time of a specific examination in which a specified model of endoscope was used, video information that was obtained by making frames corresponding to training images within this endoscope video into annotation information is made into training data. Then, the same creation of training data is further performed for an endoscope video image for a plurality of examination results, and an existing inference model is generated. An endoscope video that includes insertion or removal images is input to this existing inference model, and inference may be performed to give an output of frames used as training data. Inference in this step will be performed for images from endoscopes with different specifications and characteristics. As described previously, since there are only a few frames that constitute candidates for training data compared to the number of frames that have been obtained in an endoscopic examination, it is necessary to make fairly high precision inferences, and in this case, it is considered that the reliability will be even lower with respect to images with image quality that has not been learned. Instead, an inference model is generated by generating training data that has been obtained by performing annotation on frames that did not become candidates for training images, from a series of endoscopic images that have been obtained at the time of a specific examination using a specific model of endoscope. A method is then preferred in which endoscopic images of a plurality of inspection results are input to this inference model, images that will not become training data are selected based on the results of that inference, and examination is performed with images other than those selected images as training data candidates.

However, with the flow shown in FIG. 3A a simpler example is illustrated, in which it is determined whether or not an image has a low importance (S3), and other images are made training data candidates. Images of low importance, are determined by reflecting results that were chosen in accordance with time from among a stream of images, such as a video, at the time an inference model of exemplary specification was created. For example, when an inference model for observation and differentiation is made an exemplary model, an access image is acquired (at least made into electronic data) at the time of access regardless of what endoscope model is used, and using this image, a method of separating from other parts (parts other than access) is conceivable. Comparing images of completely different models may reduce the reliability of the comparison because objects being compared are too different, but if the model is the same, it is easy to find differences between access images and other confirmation images without an affected part or confirmed images having an affected part. These differences may be found by applying logic at the time specific training data candidate sections (frames) have been selected from proven known endoscopic images, or applying inference.

That is, for images that have been continuously obtained from the first endoscope when a known inference model was created, it is already known which frames were adopted as training data in an image group that was obtained in time series in order to determine specific image features, such as lesion detection. In other words, it is possible to determine whether it is an image group that was obtained at the first time or an image group that was obtained at the second time. Here, it is known that training data was obtained from the second time. That is, there is a learning section that obtains a first inference model for image feature determination of images for the first endoscope that was learned with results of having performed annotation on the image group that was obtained at the second time as a training data. For that learning section, a classification unit may be provided for classifying an image group that has been acquired from a second endoscope that is different to the first endoscope, using features of an image group that was obtained at the first time when the first inference model was created.

That is, if it is made possible for the information processing device that efficiently selects an image group of training data candidates as described above from all image (frame) data at the time of examination to be linked with the above-described learning section, the learning section that has already been proven is provided with new training data and high-speed learning becomes possible. That is, the above described classification section 15 uses the image group that was obtained at the first time when the first inference model was created, and determines the features of that image group (for example, differences in features etc. possessed by the first and second image groups), to divide images that have been acquired from the second endoscope that is different to the first endoscope in time. Comparing for performance such as same image quality or the same specification etc. to find differences between features of the first and second images make it possible to classify annotation candidate images from among all image frames of the specified examination image group.

Here, description has been given where the selection of annotation candidate frames is performed automatically, and the actual annotation is performed by a specialist such as a physician and completed as training data, but the annotation itself may be performed by the previously described first inference model. If a process is provided for doctors to confirm the results, it will become possible to create high-speed training data and inference models while ensuring quality.

Images (for example, refer to image Plo in FIG. 2 and image Ps in FIG. 3B) when a physician or the like is screening for endoscopic examination (during access), are images at the time the endoscope is inserted into the body and the imaging section is moved in order to search for a lesioned part, etc. The images are therefore blurry, and the image quality is low, which is not suitable for training data used when improving existing inference models. In this step S3, it is determined whether or not an image is not suitable for such training data. It should be noted that this determination, may be performed not only for one image but also in continuous image units. That is, even if the quality of the image is low with only one image, if image quality is evaluated with continuous images, in the case of an inference model for guidance display at the time of access, for example, these images may be used as training data.

As described above, since images that a low possibility of being made candidates for training data, and are of low importance, so to speak, have been determined, images other than these image may be collected as a training data candidates (S5). Here, the images that have been determined to be of low importance in step S3 are eliminated, and image data not having low importance is collected as training data. These images correspond to the image Po during observation in FIG. 3B, and should include images or the like in which a physician or the like carefully observed (examined) the lesioned part. Images that cannot be handled by an existing inference model and for which inference with a conventional inference model is troublesome, are valuable images for new inference model creation. Therefore, the images collected here are stored as the examination image group 32 (refer to FIG. 1B). When storing these images, metadata is added stating that it is an unknown image and an image for a new inference model.

If the image frames of the training image candidates can be narrowed down from tens of thousands of endoscopic frames for each examination in this way, it is possible to concentrate on which ones should be annotated and made into training data without thinking about other frames. This makes it possible to increase the efficiency of creating improved or new inference models.

Once images have been collected in step S3 or step S5, annotation 1 or annotation 2 is requested (S9). Here, the first request section 16 requests annotation 1 in order to generate a current state improvement type inference model using the images that were collected in step S7. Since this annotation 1 is an annotation for creating training data for learning in addition to existing training data which is the main training data, existing annotation tools can be used as they are.

Also, in step S9, the second request section 17 requests annotation 2 in order to generate a new inference model using the images that were collected in step S5. For this annotation 2 it is not known whether existing training data can be used (depending on the quality of the inference model), and it is necessary to obtain output for this new unknown endoscope device. Therefore, since it is not necessarily known whether or not an annotation tool similar to the conventional specification is good, annotation 2 is intentionally separated from annotation 1. Once annotations 1 and 2 are completed, the learning section 18 is requested to generate a current state improvement type inference model or a new inference model. Once annotation, has been requested this flow is terminated.

In the flow for new inference model creation, when performing inference of a lesioned part such as a tumor for the input images, it is determined whether or not inference is possible with an existing inference model, and if inference is possible, rare images that have not been seen are collected as training data candidates (refer to S1 Yes-S7). Here, the collected training data candidates are used as data for improving an existing inference model (refer, for example, to S61, S63, and S65 in FIG. 6). Also, in the case of input images that cannot be inferred with an existing inference model, except for images with a low degree of importance these images are made training data candidates. The training data candidates collected here are used as data for generating a new inference model (refer, for example, to S61 No-S67 Yes-S71 in FIG. 6).

The information processing system 10 inputs various images from various image systems 20 (including endoscopes), and it may not be possible to infer some of these images with an existing inference model. In this embodiment, even images for which inference was not possible are stored as an examination image group 32 (refer to S5), and these images can be efficiently used when generating a new inference model. Also, even in a case such as where inference is possible using the existing inference model, in a situation such as when images are different from the images acquired so far (such as when images are not similar), these images are stored as the examination image group 32.

Next, operation of a modified example of inference model creation will be described using the flowchart shown in FIG. 3C. In the flow shown in FIG. 3A, in step S1, it was determined whether or not the existing inference model was compatible, and if it could not be supported, images for creating a new inference model were collected (refer to S3 and S5), whereas if the inference model was compatible rare images that had not been seen were collected to improve the inference model (refer to S7). In this flow shown in FIG. 3C, images for creating a new inference model are collected regardless of whether or not they can be handled by an existing inference model (refer to S101 and S103). After this collection of images, rare images that have not been seen are collected for improvement of the inference model, only if they can be handled by the existing inference model (S105 Yes) (refer to S107).

Figure 3C:
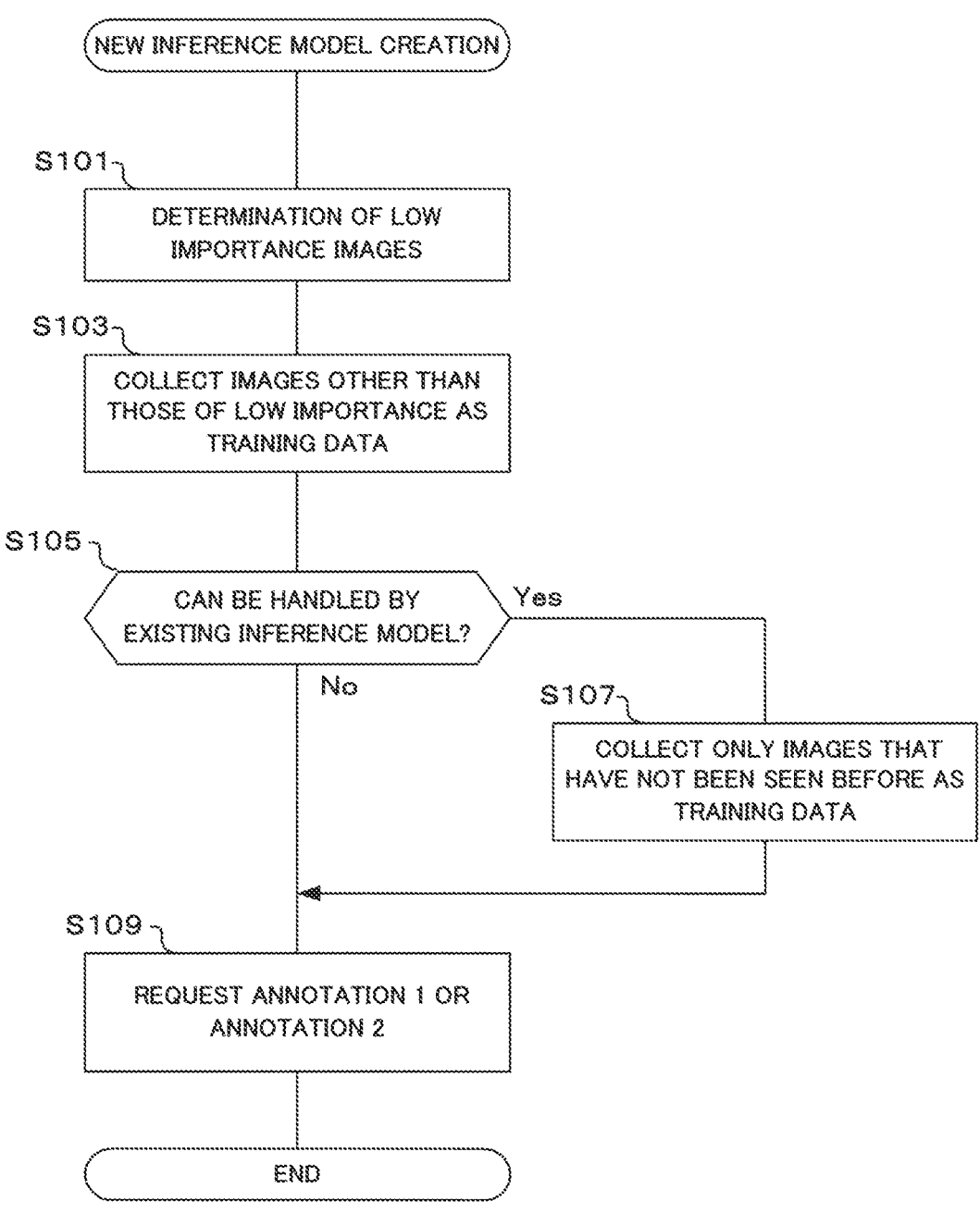
FIG. 3C is a flowchart showing a modified example of operation of new inference model creation.

In the flow of FIG. 3C, compared with the flow of FIG. 3A, steps S3, S5, S1, S7, and S9 in FIG. 3A, respectively perform the same processing as, S101, S103, S105, S107, and S109 in FIG. 3C. Since only the order of processing is different, detailed description is omitted to simplify the description.

If the flow of FIG. 3C is commenced, first, image determination as to whether or not an image is of low importance is performed (S101). Here, the classification section 15 determines whether or not an image has low importance based on the determination result of the similar image determination section 13 that was performed on the input image. As was described previously, low importance images are those determined by reflecting the result of having selected images according to time from a series of images such as a video, at the time an inference model with exemplary specifications was created. For example, if there are images that are similar to images that were not used at the time of inference model creation, they are determined to be images of low importance.

Next, images other than those determined to be of low importance are collected as training data (candidates) (S103). Here, based on the determination results in step S101, images other than images determined to be of low importance are stored in the storage section 30 as training data (candidates).

If images other than low importance images have been collected as training data (candidates), then similarly to in step S1, it is determined whether or not the existing inference model can handle the input images (S105). If as a result of this determination they cannot be handled, similarly to in step S7 only images that have not been seen are collected as training data (candidates). Once the processing in steps S105 and S107 has been performed, annotation 1 or annotation 2 is requested (S109) similarly to as in step S9, and once the request is completed, this flow ends.

As described above, in the flow in FIG. 3C, image collection for creating a new inference model can be performed regardless of whether or not the existing inference model can handle images. For this reason, a wide variety of images can be collected.

Next, one example of processing after it has been determined whether or not images can be handled by an existing inference model in step S1 (refer to FIG. 3A (S105 in FIG. 3C)) will be described using FIG. 4A and FIG. 4B. FIG. 4A is a diagram for explaining a method for determining whether or not there is an image that has not been seen, in step S7 (S107 in FIG. 3C) when it is determined that images can be handled by the existing inference model in step S1 (S105 of FIG. 3C).

In the example shown in FIG. 4A, an inference engine in which two types of inference models, namely a normal detection AI (inference model) 19A and a lesion detection AI (inference model) 19B, are set, is provided, and inference is performed for the same endoscope image PI4 using these AIs (inference models). Here, the normal detection AI 19A determines whether or not the endoscope image PI4 is normal, in other words, whether the endoscope image PI4 is not abnormal. Also, the lesion detection AI 19B determines whether or not there is a lesioned part in the endoscope image PI4. The inference model for inferring whether or not there is a lesioned part such as a tumor generally corresponds to this lesion detection AI. If this lesion detection AI is made the first inference model, the normal detection AI corresponds to a third inference model.

It should be noted that images in which there is no lesion are made training data, and the inference model set to the normal detection AI 19A is generated by learning using this training data. As described previously, this inference model can infer whether or not an input image is normal. Images for generating this inference model may be those collected images that have been determined as other in step S27 of FIG. 5B, which will be described later.

If the endoscopic image PI4 is normal, that is, when there is no abnormality, the normal detection AI 19A determines that it is normal, and the lesion detection AI 19B determines that there is no lesion. However, the example shown in FIG. 4A shows a case where the existing inference model is not suitable for inferring the endoscope image PI4, and the inference result from the normal detection AI 19A is "abnormal", while the inference result from the lesion detection AI 19B is "no lesion". That is, the judgment results of the two AIs are contradictory.

Thus, even if inference for the endoscopic image PI4 is possible using the existing inference model, if the determination results from the two AIs are contradictory, the endoscopic image PI4 can be said to be a rare image that has not been seen. In this case, the image is made an image that has never been seen, and is stored as an examination image in the examination image group 32 of the storage section 30, annotation may be performed to create training data, and this training data may be used to improve the existing inference model.

When the image similarity determination section 13 determines that it is a rare image that has never been seen, as described above, the first request section 16 requests annotation on this image, creates training data, and requests generation of an inference model using this training data. That is, the first request section 16 functions as a first request section (first request processor) that requests annotation, in an image group, for training data in order to generate a third inference model that is an improvement on the first inference model, according to the reliability of the result of having performed inference of the same image (for example, image PI4) with the first inference model (normal detection AI 19A) (refer, for example, to FIG. 4A and S27-S33 in FIG. 5B). For that reliability, if the result of inference by the first inference model is that, for example, it has been inferred that the image has been acquired by the first endoscope (such as an endoscope made by a specific manufacturer), or that it has been inferred that other lesions has been correctly determined, it may be determined to be reliable.

The example shown in FIG. 4B shows a case where it has been determined that images cannot be handled by the existing inference model in step S1 (S105 in FIG. 3C). In this case, the image change rate of the endoscope image PI5 is detected, and it is determined whether or not screening (access) is in progress, that is, the doctor or the like is in the process of searching for a lesioned part and moving the imaging section. Further, it is determined whether or not a distance between the endoscope and the surface in the body is shorter than a predetermined distance (object proximity determination). If the result of this determination is that the object distance is closer than a predetermined distance, it can be determined that the physician or the like is in observation.

Thus, when it has been determined that the existing inference model cannot handle the input images, it is determined whether or not screening is in progress based on the image change rate, and whether or not observation is in progress based on the object distance. Unimportant images such as images during screening are filtered (that is, unimportant images are eliminated), and important images (for example, images during observation) are stored as examination images in the examination image group 32 in the storage section 30. These images are annotated and used as training data when creating a new inference model.

Next, specific operations of an endoscope, as the information processing system and image system of this embodiment, will be described using the flowcharts shown in FIG. 5A to FIG. 5C.

The flowchart shown in FIG. 5A describes the main operation of the endoscope 1. The information processing system 10 is connected to various endoscopes and acquires various information from the image acquisition section. The endoscope 1 is an endoscope manufactured by a specific manufacturer, and the information processing system 10 has generated an existing inference model 19a based on images from this endoscope 1. The main operation of the endoscope 1 shown in FIG. 5A is realized by a control section 21 in the image system 20 corresponding to the endoscope 1 controlling each section in the image system 20.

If the flow for the endoscope 1 of FIG. 5A is commenced, an image is first acquired, and displayed (S11). Here, the image acquisition section 23 acquires an endoscope image and displays the endoscope image on the display in the display section 24. While viewing this endoscope image, the physician or the like operates the endoscope 1, moves the imaging section of the endoscope 1 to the target site, and observes the target site.

Once an image has been acquired and displayed, the image is then transmitted to the information processing system 10 and inference results are acquired (S13). Here, the control section 21 transmits the image that was acquired by the image acquisition section 23 to the information processing system 10 through the communication section. At this time, model information (information indicating the endoscope 1) is transmitted to the information processing system 10 together with the image information (refer to S23 in FIG. 5B). The information processing system 10 that has received the image infers whether or not there is a lesioned part such as a tumor using the existing inference model 19a of the inference engine 19, and returns the inference result to the endoscope 1 (refer to S25 in FIG. 5B). When the image system 20 receives this inference result, it also receives reliability of the inference result.

Next, it is determined whether or not the determination result was obtained with high reliability (S15). Here, based on the reliability result of the inference received in step S13, the control section 21 determines whether or not this reliability is higher than a predetermined value. If the result of this determination is that the reliability is lower than the predetermined value, processing returns to step S11.

On the other hand, if the result of determination in step S15 is that reliability is high, the determined position is then displayed with a frame in the image (S17). In step S13, if the inference engine 19 infers the presence or absence of a lesioned part such as a tumor, and its position if it there is a lesioned part, and so the endoscope 1 receives this inference result. In this step, the display section 24 displays the position of a lesioned part such as a tumor, that was inferred by the inference engine 19, with a frame. It should be noted that the display method may also adopt a display method other than the frame. Also, in this step, an operation guide may be displayed to the operator of the endoscope. For example, "possible bleeding" may be displayed. For this guide, an inference model for the guide may be prepared and the guide may be output by this inference model. Once the determination position has been displayed with a frame, the processing returns to step S11.

Next, the main operation of the information processing system 10 will be described using the flowchart shown in FIG. 5B. The information processing system 10 is connected to various endoscopes, as was described previously, and acquires various information from the image acquisition section. This information processing system determines whether the endoscope images transmitted from various endoscopes are images that can be used in a current state improvement inference model, are images that can be used for creating a new inference model, or are other images. Then, in accordance with the result of this determination, annotation is requested and training data is created, and generation of an inference model is requested. The main operation of the information processing system shown in FIG. 5B is realized by the control section 11 of the information processing system 10 controlling each section within the information processing system 10.

When the flow for the information processing system in FIG. 5B is commenced, first, an image acquisition standby state is entered (S21). As described previously, the information processing system 10 can be connected to various endoscopes, and endoscope images are transmitted from each endoscope. In this step S21, the control section 11 is in a standby state so that images from various endoscopes can be received.

Next, once an image has been acquired, it is determined whether or not it is a target image (S23). Here, the control section 11 determines whether or not the image that has been received by the information processing system 10 is an image to be subjected to determination for the presence or absence of lesioned part such as a tumor. Here, the control section 11 determines whether or not it is a target image based on an image scene or the like (for example, an image in the body and an image when a physician or the like is examining). For example, when a physician or the like is examining the target site (the site where an affected part, such as a lesion or a tumor, is likely to exist, etc.), the tip of the endoscope is stopped at the same position, and the lesioned part is searched for around that position. Whether or not an examination is in progress may be determined by analyzing the endoscope image, or may be determined based on the operating state of a physician or the like. If the result of this determination is not a target image, processing returns to step S21.

On the other hand, if the result of determination in step S23 is a target image, the inference result and reliability are transmitted (S25). Here, the inference engine 19 uses the existing inference model 19*a* to infer whether or not there is a lesioned part such as a tumor in the target image, and if there is a lesioned part, the position of that lesioned part. Also, the reliability of the inference is also calculated at the time of inference. When the inference by the inference engine 19 is completed, the inference result and its reliability are transmitted to the image acquisition source (refer to S13 in FIG. 5A).

Next, it is determined whether it is an improvement of the current situation, a new model, or something else (S27). In this flow, the control section 11 determines whether or not there is an image that could not be collected so far, and uses the image that has not been collected so far as training data. Here, first, the control section 11 determines whether the received target image is suitable for generating a current state improvement type inference model, or suitable for a new inference model, or something else, when generating an inference model. As described previously, the information processing system 10 can be connected to various inspection devices such as endoscopes via the Internet or the like. Regarding these endoscopes etc., there are endoscopes made by a specific manufacturer that were used when generating an existing inference model, there are also endoscopes that are comparatively similar to the endoscopes made by this specific manufacturer, and there are endoscopes that are completely unknown in the market. In this step, even with endoscopic images besides those from a specific manufacturer, in order to generate an inference model for inferring a lesioned part such as a tumor, the endoscope image received in step S23 is subjected to determination. Details of this determination in step S27 will be described later using FIG. 6.

If the result of determination in step S27, is that images are not for improving the current situation, or for a new inference model, other processing is performed (S28). Here, images that are judged to be neither an improvement of the current situation nor a new inference model are stored. As will be described later (refer to S61 and S63 in FIG. 6), since the endoscope is an existing model and the reliability not between 40-60%, it is an image in which it is clear whether or not there is a lesioned part such as a tumor. Therefore, by storing this image and using it as training data, AI can be created to infer that there is no abnormality. Once the process in step S28 has been executed, processing returns to step S21.

On the other hand, if the result of determination in step S27 is that the image is suitable for improving the current situation, the image is next stored as a training data candidate (S29). Here, the control section 11 stores the image in the examination image group 32 in the storage section 30 as images suitable for generating an inference model for improvement of existing inference. For example, rare images that physicians have never seen before can help improve existing inference models. When storing an image in the examination image group 32, it is preferable to store category information, indicating that it is an image for improvement of existing inference, as metadata.

Next, annotation is requested (S31). Here, the control section 11 requests the addition of annotation in order to generate an inference model for improving the current situation. In the annotation, a specialist such as a physician associates data indicating the location of a lesioned part such as a tumor with the image data. As well as specialists such as physicians manually adding annotation, annotation may be added automatically using AI or the like, or may be assigned by specialists with reference to AI advice.

Next, the new training data is chosen and learned, to create an improved inference model (S33). Once the annotation has been assigned, new training data can be created, and so the control section 11 appropriately selects the new training data. That is, training data that is suitable for generating an improved inference model is selected from among the new training data. Once the new training data has been selected, the first request section 16 next requests the learning section to generate an improved inference model. Learning is requested to the learning section 18 in the information processing system 10, but if there is no learning section in the information processing system 10, a request is sent to an external learning section. If the generation of an improved inference model has been requested, the processing returns to step S21.

Returning to step S27, if the result of determination is that the image is suitable for generating a new inference model, the examination image determination for the existing training data is performed (S35). As described previously, the examination image group at the time of existing training data creation 31 is acquired at the first time and the second time, and the image data is stored when generating an inference model suitable for an existing endoscope. As described previously, the second time is a time when the physician or the like is examining the target part (for example, refer to image Po in FIG. 3B), and the image is a still picture having high image quality with high clarity. In this step, the image similarity determination section 13 determines whether or not the acquired images are similar examination images for existing training data that are similar to the images stored in the examination image group at the time of existing training data creation 31.

Next, images that are not in the similar examination image group for existing training data are stored as an examination image group (S37). In this step, the control section 11 stores only images for which the result of determination in step S35 is that they have been determined to be not similar to the examination image group at the time of creation of existing training data (other than examination images for existing training data) as the examination image group, and stores these images in the storage section 30 as the examination image group 32. These images are likely to have been acquired with a completely unknown endoscope that is not known in the market, and by performing inference using these images, an inference model suitable for this completely unknown endoscope can be created.

Next, annotation is requested, and images that have not been annotated are added to the examination image group (S39). Since the images were determined to be the examination image group in step S37, they are images that were acquired by a completely unknown endoscope or the like, and so the images are also of an unknown type. Therefore, addition of annotation is requested, in order to generate a new inference model. This annotation may be performed automatically using AI or the like, as well as being manually attached by specialists such as physicians. Although images that were not annotated are not used in the creation of the new inference model this time, they may be used when creating an inference model on another occasion, and these images are added to the storage section 30 as the examination image group 32. At the time of this storage, a tag indicating that it was an image without annotation is added.

Next, images in the examination image group that have been annotated are stored as new training data (S41). Once the annotation is completed for the examination image group that has been stored step S37, the control section 11 makes this image new training data, and stores as the examination image group 32 in the storage section 30.

Next, the new training data is selected, learning is performed, and a new inference model is created (S43). Once the new training data has been created, the control section 11 next appropriately selects the new training data. That is, training data that is suitable for generating a new inference model is selected from among the new training data. Once the new training data has been selected, the second request section 17 next requests the learning section to generate a new inference model. Similarly to when generating an improved inference model, learning is requested to the learning section 18 in the information processing system 10, but if there is no learning section in the information processing system 10, a request is sent to an external learning section. If the generation of a new inference model has been requested, the processing returns to step S21.

Figure 5C:
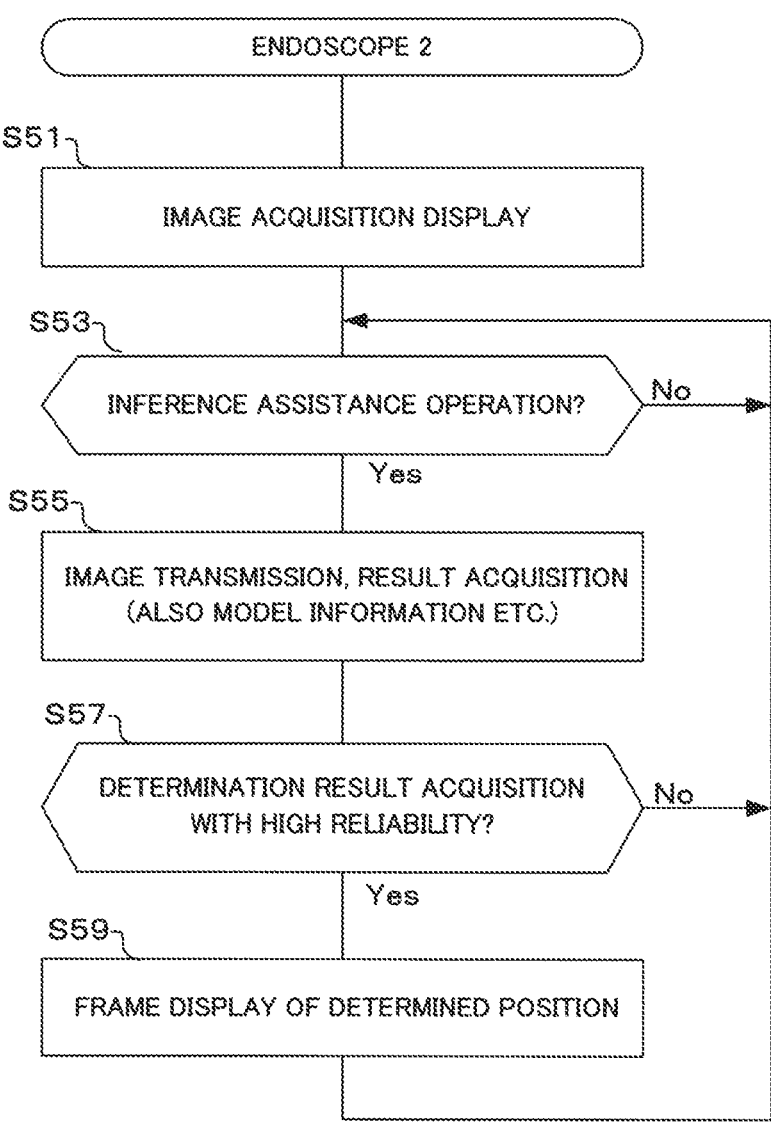
FIG. 5C is a flowchart showing operation of an endoscope 2.

The flowchart shown in FIG. 5C describes the main operation of the endoscope 2. The information processing system 10 can be connected to various endoscopes, as was described previously, and acquires various information from the image acquisition section. The endoscope 2 is different from the endoscope 1 in that it is an endoscope manufactured by a manufacturer other than a specific manufacturer, and is an endoscope that generated the image PI2 or image PI3 in FIG. 2. The information processing system 10 has never generated an inference model based on images from the endoscope 2. The main operation of the endoscope 2 shown in FIG. 5C is realized by the control section 21 in the image system 20 corresponding to endoscope 2 controlling each section in the image system 20.

If the flow for the endoscope 2 of FIG. 5C is commenced, an image is first acquired, and displayed (S51). Here, the image acquisition section 23 within the endoscope 2 acquires an endoscope image and displays the endoscope image on the display in the display section 24. While viewing the endoscope image, the physician or the like operates the endoscope 2, moves the imaging section of the endoscope 2 to the target site, and observes the target part.

Next, it is determined, whether or not an auxiliary operation has been performed using inference (S53). In the event that the endoscope 2 is an unknown endoscope that is not known in the market, the operator such as a physician may also not be familiar with it. In this type of case, the operator may ask for assistance using inference. In order to request inference assistance, for example, an operation member for requesting an auxiliary operation to the endoscope 2 may be provided. Also, even if the operator such as a physician does not perform the request operation, it may be automatically determined whether or not an inference assistance operation has been performed based on an analysis result of the endoscope image and the operating state of the endoscope. Obviously, whether or not an auxiliary operation is required may be determined by an inference model performing inference. If the result of determination in this step is that the operator does not request an inference assistance operation, a standby state is entered.

If the result of determination in step S53 is that an inference assist operation was performed, an image is then transmitted to the information processing system 10 and an inference result is acquired (S55). Here, the control section 21 of the endoscope 2 transmits the image that was acquired by the image acquisition section 23 to the information processing system 10 through the communication section. At this time, model information (information indicating the endoscope 2) may also be transmitted to the information processing system 10 together with the image information. The information processing system 10 that has received the image infers whether or not there is a lesioned part such as a tumor using the existing inference model 19a of the inference engine 19, and returns this inference result to the endoscope 2 (refer to S25 in FIG. 5B). When this inference result is received, reliability of the inference result is also received.

Next, it is determined whether or not the determination result was obtained with high reliability (S57). Here, based on the reliability result of the inference received in step S55, the control section 21 determines whether or not this reliability is higher than a predetermined value. If the result of this determination is that the reliability is low, processing returns to step S53.

On the other hand, if the result of determination in step S57 is that reliability is high, the determined position is then displayed with a frame (S59). In step S55, if the inference engine 19 infers the presence or absence of a lesioned part such as a tumor and there is a lesioned part, an inference result of the position of that lesioned part is received. In this step, the position of a lesioned part such as a tumor, that was inferred by the inference engine 19, is displayed with a frame in the image. It should be noted that the display method may also adopt a display method other than the frame. Once the determination position has been displayed as a frame, the processing returns to step S53.

Thus, in the operation of the information processing system and the endoscopes 1 and 2, if the information processing system 10 receives an image from the image system (endoscopes 1 and 2), it performs inference using the inference model 19a and returns an inference result to the image system (refer to S21-S25). As a result, in the image system, even if there is not an inference engine, the presence or absence of a lesioned part such as a tumor, and its position, can be easily known. In addition, if the acquired image is a rare image that has never been seen, even if it is an image acquired by an existing endoscope, these images are collected and a current state improvement type inference model is created (refer to S29-S33).

Also, in the operation of the information processing system, in the case of an image that was acquired with a completely unknown endoscope different from the existing endoscope (for example, endoscope 2 shown in FIG. 5C), if that image is dissimilar to the first image, this image is collected as an examination image and a new inference model is generated (refer to S35-S43). In order to create an inference model suitable for unknown endoscope images, it is necessary to collect a large number of images, but with this system, images collected on a daily basis from various endoscopes can be efficiently used.

Next, details of the operation to determine either a current state improvement, a new model, or something else, in step S27 (refer to FIG. 5B), will be described using the flowchart shown in FIG. 6.

If the flow of FIG. 6 is commenced, it is first determined whether or not model information already exists (S61). The model information is information such as the endoscope 1 in FIG. 5A, the manufacturer name of the endoscope 2 in FIG. 5C etc., and model names for that manufacturer. Based on this model information and the like, it is determined whether or not the images that were received in steps S21 and S23 are images that were acquired by an endoscope made by an existing manufacturer that was used when generating the existing inference model 19a. Since the model information may be included in the category information etc. associated with the image, the control section 11 determines the model information based on the category information. In this step, without being limited to model information, determination as to whether or not there is any relation to an existing model may be based on information such as modes, accessories, and procedures. When tag data or the like indicating model information, etc. is not attached to the image, determination may be based on characteristics of the image, the shape of the image, and the like.

If the result of determination in step S61 is that the model information or the like is an existing manufacturer, it is next determined whether or not the reliability of tumor (lesioned part) determination is within a specific range (S63). In step S25 (refer to FIG. 5B), inference of a lesioned part such as a tumor is performed, together with determination of the reliability of the inference at this time. The reliability of inference is not necessarily one of either 0% or 100%, and a value somewhere in between will be sometimes obtained. When the reliability is 40%-60%, in a case where estimation of the lesioned part such as a tumor was performed using an existing inference model, that inference result cannot be said to be either correct or wrong. When the reliability is 0%, the existing inference model does not fit at all, while when the reliability is 100%, the existing inference model is completely suitable. When the reliability is in a specific range, the endoscope image that is a subject of inference does not fit the existing inference model exactly, indicating that there is room for improvement in the existing inference model.

Therefore, if the result of determination in step S63 is that the reliability is not within a specific range (for example, 40~ 60%), it is set to other (S73), and processing advances to step S28 in FIG. 5B. On the other hand, if the result of determination in step S63 is that the reliability is within a specific range, performing improvement of the current situation is set (S65, S75), and processing advances to S29 in FIG. 5B.

Returning to step S61, in a case where the model information is not an existing endoscope or the like, it is then determined whether or not it is a completely unknown model taking into consideration differences in image quality characteristics and procedure (S67). In this step, it is determined whether the input image is an image that was acquired by a completely unknown endoscope model, or that is not significantly different from an existing endoscope, or is an image acquired by an endoscope model known in the market. Since the result of determination in step S61 was No, it can be said that the input image is an image that was acquired by an endoscope that is not an existing model (a model that was used to generate an existing inference model). Therefore, the control section 11 determines whether or not it is a completely unknown model, taking into consideration differences in the quality characteristics of the image and the procedure. When considering differences in image quality characteristics and procedure, the model, image quality (optical characteristics), illumination, angle of view, operational situation, treatment tools, etc., and reliability are considered. In surgical endoscopes and the like, since the inference model differs if the procedure is different, whether to use a new inference model or an improved model may be switched depending on the procedure.

In step S67, in a case where model information is associated with the endoscope image that was received by the information processing system 10, based on this information, it is determined whether it is an endoscope model that is not significantly different from the model that generated the existing inference model, or a completely unknown model. Further, since the image quality (optical characteristics), illumination and angle of view, and the like of the image depend on the characteristics of the manufacturer, the model can be determined based on these items of information. Furthermore, since the operating method is characterized by the endoscope manufacturer, and the treatment tools that are used are also different, the model can be determined based on the acquired image (particularly a video). Furthermore, the model can be determined by reliability of the inference.

If the result of determination in step S67, is that it has been determined that the endoscope image was not acquired by a completely unknown model, it is set to new model 1 (S69). Since the acquired endoscopic image is not an existing model, but is not significantly different from the existing model, it can be said that generating a new inference model to the extent that it improves the existing inference model will be sufficient. Therefore, in step S69, the generation of a new model 1 is designated, the current situation is improved (S75), and the processing advances to step S29 in FIG. 5B.

If the result of determination in step S67, is that it has been determined that the endoscope image was acquired by a completely unknown model, it is set to new model 2 (S71). Since the acquired endoscope image is an image of an unknown model of endoscope that is completely different to the existing model, a new inference model will be generated. Therefore, in step S71, the generation of a new model 2 is designated, a new model is set (S77), and the processing advances to step S35 in FIG. 5B.

In this way, in the determination flow shown in FIG. 6, the endoscope etc. that acquired the endoscope image is determined based on the model information, reliability range, quality characteristics such as image quality, illumination, angle of view, etc. of the image, and operation processing, treatment tools, procedure, and an inference model that will be generated is switched based on these determination results. That is, images that have been acquired by various endoscopes collected in the information processing system 10, can be efficiently used according to the characteristics of these images.

Next, operation of the learning device (information processing device) will be described using the flowchart shown in FIG. 7. This operation is realized by the learning section 18 in the information processing system 10 controlling each section within the information processing system 10 according to a program stored in the memory. In order to realize this flow, the learning section 18 may have a control processor such as a CPU, and each section in the information processing system 10 may be controlled so that the control section 11 realizes this flow. Furthermore, the learning section 18 may of course be provided outside the information processing system 10 without being provided in the information processing system 10.

If the flow for learning in FIG. 7 is commenced, first, it is determined whether or not there is a target scene (S81). The target scene is a scene in which the target part, such as a lesioned part such as a tumor, is observed, and as well as observation, it is a scene that is a target for learning. Here, the information processing system 10 determines whether or not there is a target image based on an image scene or the like (for example, an image in the body and an image when a physician or the like is preforming examination). As described previously, this determination may be made based on model information that has been associated with the image, or may be determined based on image quality (optical characteristics) and other information (refer to S67 in FIG. 6).

If the result of determination in step S81, is that there is not a target scene, it is stored as a first time image group (S83). In this case, the acquired endoscope image is an image of a non-target scene, for example, from when the endoscope is inserted to the time when the target part is searched for and then the endoscope is removed, that is, an image for the first time. The information processing system 10 stores the acquired image as the first time image in the first time image section 31c of the storage section 30.

If the result of determination in step S81 is that there is a target scene, it is stored as a second time image group (S85). In this case, since it is an image of a target scene, it is often an image that is suitable for generating an inference model. In the case of an image taken with a model that is different from the one used to create an existing inference model, the image is used for generating a new inference model. The information processing system 10 stores the acquired image as the second time image in the second time image section 31d of the storage section 30.

Next, the annotation result is stored (S87). Here, the learning section 18 (control section 11) requests assignment of annotation indicating the position of a lesioned part such as a tumor in the image, and stores the image that has been subjected to this annotation, that is, the training data, in the image file 31A. It should be noted that annotation may be added using AI or the like.

Next, learning is performed (S89). Here, when the acquired training data that was subjected to annotation in step S87 is input to the neural network of the inference engine, machine learning is performed using that training data so as to output the position of the lesioned part such as a tumor, and weight of the neural network is set.

Once learning has been performed in step S89, it is then determined whether or not the learning result has secured a high reliability (S91). This determination may be performing of determination as to whether or not high reliability has been secured by trying inputting of test data into the inference model, and comparing with a predetermined reference value, for example, to determining what range an error falls into, or how much test data falls within a specific error.

If the result of determination in step S91 is that high reliability cannot be ensured, the image is selected (S93). Here, images that have reduced reliability are eliminated and images that can improve reliability are added. Once the image has been selected, the processing returns to step S81 and the above-described operation is repeated. It is also possible to return to S89, and perform learning again.

On the other hand, if the result of determination in step S91 is that high reliability is secured, the inference model, specifications, version, etc. are stored (S95). Since it was possible to create a highly reliable inference model, this inference model, specification when generating this inference model, version information, etc. are stored in the storage section 30 etc. Once these items of information have been stored, the inference model is set and the operation of the learning device ends. Here, the inference model that has been created can be used when the information processing system 10 receives an image of the same or similar type as the image that was stored as the examination image group, and when performing inference of a lesioned part such as a tumor.

Thus, in the learning flow shown in FIG. 7, when the information processing system 10 performs learning for generating an inference model, it determines whether or not the input endoscope image is a target scene (S81). Then, if it is a target scene, this image is collected as a second time image (S85), training data is created using this image, and an inference model is created (S87-S89). The images that have been collected by the information processing system 10 can therefore be used efficiently.

Also, if the image is not a target scene, it is stored as a first time image. The first time image is not directly used for learning in order to create an inference model (S89), but includes information indicating what kind of image can be adopted in the inference model, in contrast to the second time image. When creating a new inference model, this information is adopted, and can be used when selecting an image for a new inference model creation from the examination image group 32 accumulated so far.

With the concept in this embodiment that has been described, in a case where there is an inference model with specific specifications, and the training data at the time that inference model was learned and provenance of a video constituting the source of the training data has been associated with the inference model, when improving or newly creating an inference model with the same or similar specifications, a relationship between the source video of the training data and the image frame that became the training data in that video is referenced. It is then possible to provide an annotation process to simply find image frames of new training data candidates. This concept can also be realized by an embodiment of inferring the image frames of these training data candidates. Therefore, description will be given, using FIG. 8A and FIG. 8B, for, in a case where there is a series of images (may be a video or a plurality of still images), generation of an inference model to select any image as an image for creating training data, and of inference using that inference model.

As described above, in this embodiment, in order to efficiently collect new training data, it takes advantage of the fact when creating an already proven inference model, images depicting objects to be detected were selected from among countless images. That is, it is possible to generate an inference model to extract images that constitute annotation candidates by learning by performing annotation on images selected for creating training data in a continuous of image group.

FIG. 8A and FIG. 8B show a learning method (see FIG. 8A) for creating an inference model for selecting annotation candidate images using the examination video (still image frame group) obtained so far, and appearance of inputs and outputs of an inference model that was generated using this learning (FIG. 8B). That is, from the relationship between the proven examination video up to now and the proven training data in that video, it is possible to create an inference model that detects a limited number of frames from the examination video consisting of a huge number of frames.

A series of examination videos Pm1-Pm3 are examination images as training data. If this series of examination videos Pm1-Pm3 are respectively treated as one image, and any of these images is designated as an image to be annotated, it is possible to perform inference, similarly to inferring where a face is located using so called face detection technology in photographic images.

It should be noted that in FIG. 8A, in a series of examination videos Pm1, the image Pmi1 is an image group at the time of insertion, the images Pma1 is an image group to be annotated, and the images Pmr1 is an image group at the time of removal. Before machine learning is performed, if there is an image (here, the examination image Pma1) that has been subjected to annotation for the presence of a lesioned part such as an affected part in a series of examination videos, that image is subjected to annotation for creating an inference model that selects annotation candidate images.

However, since a huge number of images are included in the series of examination videos Pm1-Pm3, the amount of data becomes enormous. Therefore, after performing thinning of the pixels of each frame, compressing of the frames themselves, or all of the video, etc. as necessary, the image to be annotated may be selected and made into training data. Further, although FIG. 8A has been described with a video as an example, not only video data but also other treatment information Ti1, Ti2, and the like for a particular time may be embedded as part of the data. This information, together with changes in the image, is also useful information for detecting features. In FIG. 8A, only three examination videos, Pm1-Pm3, are shown, but there are actually many examination videos.

Thus, with this embodiment, for endoscopic video information (examination image Pm1 as training data in the drawing) obtained at the time of a specific examination, frames corresponding to training images, within the endoscope video (in the drawing, the examination image Pma1 to be annotated) is made into annotation information. Video information that has been obtained by doing this is made training data, and further, the same or similar training data is created for endoscopic video images of a plurality of examination results (examination images Pma1 to Pma3 as training data in FIG. 8A). If the training data has been created, an endoscopic video including insertion images or removal images is input to the input layer In of the neural network NNW, and an inference model is created by performing learning so that the output layer Out constitutes the training data frames (Pma1~ Pma3).

Incidentally, in describing this embodiment, it has been written assuming that images of insertion and removal would be included, but this is not mandatory. In other words, with the concept of normalization, following the same or similar type of rules, for example, detecting eyes after detecting a face image, which is in keeping with the precedent of improving eye detection accuracy. Therefore, it is possible to create a similar inference model, that does not include insertion and removal, includes images constituting training data candidates, and includes a video before and after those training data candidates. At this time, if changes in treatment and imaging methods etc. are made into information and stored synchronously with images, the amount of information for inferring images other than training image candidates increases, and good inference becomes possible.

Once an inference model has been generated by the method shown in FIG. 8A, the generated inference model is next set in the inference engine InEn shown in FIG. 8B. If the newly acquired examination video Pmx is input to the input layer In of this inference engine InEn, it is inferred which frame is the image to be annotated, and an annotation candidate image can be output from the output layer Out. The examination video may include treatment information Tix1, Tix2, etc. At the time of inference, each image included in the video is arranged in chronological order, and it is determined as huge image data that can be expressed, as if it were, like a panoramic composite image, and from there, inference may be performed to find a part that is suitable for actual training data. Also, if the treatment information can be effectively used, inference of annotation candidates may be performed also using this treatment information.

In such a method shown in FIG. 8A and FIG. 8B, the inference model determines the first time image group and the second time image group, and determines the second time image group, or training data candidate frames within the second time image group by inference. In particular, an examination video in a case such as where there is a similar affected part in a similar area includes a similar image information, and so good inference can be performed.

Therefore, with the method for creating an inference model of this embodiment, for endoscope video information obtained during a specific examination (refer, for example, to examination images Pm1-Pm3, etc.), video information that was obtained by making frames corresponding to the training image, within the endoscope video, into annotation information is made into training data. Then, making of the same training data is performed for endoscope video images of multiple examination results (for example, annotation images Pma1-Pma3, etc.), an endoscope video including insertion or removal images is input to the learning device (refer to the input layer In of neural network NNW), and an inference model is created by performing learning, such that frames of the training data are output (refer to the neural network output layer Out).

As has been described above, in the one embodiment of the present invention, for the purpose of performing determination of specified image features for images obtained from a first endoscope, an information processing device is capable of collaboration with a learning section to determine whether an image group that has been obtained in time series by the first endoscope is an image group obtained at a first time or an image group obtained at a second time, and to obtain a first inference model for image feature determination of images for the first endoscope by performing learning with results of having performed annotation on an image group that was obtained at the second time as training data. This information processing device has a classification section that classifies newly acquired image groups from first or second endoscope using the image group that was obtained at the first time when the first inference model (existing inference model) was created. This means that it is possible to efficiently collect an image for generating a second inference model that is different from the first inference model.

Also, it is determined whether the image group that was obtained in chronological order using the first endoscope is either an image group obtained at the first time (image during access) or an image group obtained at the second time (image when searching for and examining a lesioned part such as a tumor), and an image group for generating a second inference model is made by selecting images from images obtained at the first time as well as at the second time. This means that images at the time of access can also be used, and it is possible to efficiently collect images for the second inference model.

Also, in the one embodiment of the present invention, there are a dividing step for dividing the examination moving images obtained from the first endoscope according to the time (for example, a first time or a second time), an image classification step for, among the divided times, removing frames corresponding to the first time from training data candidates, and adopting frames corresponding to the second time in training data candidates (refer, for example, to S35, S37, etc. in FIG. 5B), a storage step for storing of an examination video for classifying each divided time (refer, for example, to S37 etc. in FIG. 5B), and a step of learning a first inference model for inferring affected part information included in frames of the examination video, using at least one of the training data candidates. (refer, for example, to S89 etc. in FIG. 7). This means that it is possible to efficiently collect images for generating a second inference model that is different from the first inference model, and to efficiently create the second inference model.

Further, in the one embodiment of the present invention, there is an annotation step in which results of having performed annotation on frames corresponding to the second time are made training data candidates (refer, for example, to S85, S87, etc. in FIG. 7). Also, in the one embodiment of the present invention, when creating a second inference model that is different from the first inference model, there are a step of acquiring a new examination video (for example, refer to S81 in FIG. 7) and a selection step for selecting training data candidates for the second inference model by classifying the new examination vide with classifications that reflect the image classification results (refer, for example, to S85, S87, etc. in FIG. 7).

It should be noted that in the one embodiment of the present invention, although description has focused on endoscope images, besides endoscope images, the present invention can also be applied to information processing devices that generate inference models using images of various examination devices. That is, it is expected that the technology for selecting training image candidates from among time-series image frames will used in various fields. In this embodiment, it has been described that a video that has been obtained in the process of examination is classified and analyzed in chronological order for each time by giving examples of insertion and removal into and from a body cavity peculiar to the endoscope. However, such a normalized procedure is not limited to endoscopic images, and it can be used in any kind of field.

For example, in the medical field, it can also be applied to other imaging diagnostic devices such as ultrasound and radiation, and it can also be applied to emergency judgments in the operating room. There are inference models for purposes such as, for images acquired by surveillance cameras and the like, determining an emergency based on human behavior and movement, situational changes in groups of people etc., and outputting auxiliary information. In this example also, the process of finding specific data from a large amount of data obtained over time is time-consuming. Therefore, training data is required for inference model creation, and this embodiment can be applied if there is a technique for selecting candidate information to be made into training data from a large amount of information. Of course, the present invention is not limited to image information.

In the field of lesion detection also, there are various approaches such as differentiation, oversight prevention, and educational applications. As well as applications in these types of fields, training data is also required in applications such as insertion guides and treatment guides, and if a technique for selecting candidate information for making into training data from a large amount of information is required, this embodiment can be applied.

Obviously, apart from the medical field, for example, in the field of autonomous driving, such as entering from a highway interchange and coming off at an interchange, in video frame sections that are sandwiched between specific processes, various situational determination inference models are required for roads, bridges, tunnels and other structures, relationships with other vehicles, signs, etc., the concept of this embodiment can be applied. Even when what kind of concept was used to create an inference model remains as evidence, it is possible to prevent black-boxing by clarifying the method from data procurement to selecting training data candidates, as in this embodiment.

In the one embodiment of the present invention, the information processing system 10, the image system 20, and the storage section 30 have been described as separate bodies, but two of these may be configured integrally, or all three may be configured integrally. Also, with the one embodiment of the present invention the control section 11 and the control section 21 have been described as devices constructed from a CPU and memory etc. However, besides being constructed in the form of software using a CPU and programs, part or all of each of these sections may be constructed with hardware circuits, or may have a hardware structure such as gate circuitry generated based on a programming language described using Verilog, VHDL (Verilog Hardware Description Language), or may use a hardware structure that uses software, such as a DSP (digital signal processor) Suitable combinations of these approaches may also be used.

Also, the control sections 11 and 21 are not limited to CPUs, and may be elements that achieve the functions as a controller, and processing of each of the above described sections may also be performed by one or more processors configured as hardware. For example, each section may be a processor constructed as respective electronic circuits, and may be respective circuit sections of a processor constructed with integrated circuits such as an FPGA (Field Programmable Gate Array). Also, one or more processors are configured with a CPU, but it is also possible to execute functions of each section by executing reading of computer programs that have been stored in a storage medium.

Also, in the one embodiment of the present invention, the information processing system 10 has been described as having a control section 11, an input determination section 12, an image similarity determination section 13, a metadata attachment section 14, a classification section 15, a first request section 16, a second request section 17, and a learning section 18. However, these sections do not need to be provided inside an integrated device, and, for example, each of the above described sections mat also be dispersed by being connected using a network such as the Internet.

Also, in recent years, it has become common to use artificial intelligence such as being able to determine various evaluation criteria in one go, and it goes without saying that there may be improvements such as unifying each branch etc. of the flowcharts shown in this specification, and this is within the scope of the present invention. Regarding this type of control, as long as it is possible for the user to input whether or not something is good or bad, it is possible to customize the embodiment shown in this application in a way that is suitable to the user by learning the user's preferences.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An information processing device capable of collaboration with a learning device to determine, for the purpose of performing determination of specified image features, for images that have been obtained successively from a first endoscope, whether an image group that has been obtained in time series by the first endoscope is an image group obtained at a first time or an image group obtained at a second time, and to create a first inference model for image feature determination of images for the first endoscope by performing learning with results of having performed annotation on the image group that was obtained at the second time as training data, the information processing device comprising:

at least one or a plurality of classifying processors that classify image groups constituting training data candidates, within an image group from the first endoscope that has been newly acquired, or an image group from a second endoscope, using the image group that has been obtained at the first time, when the first inference model was created.

2. The information processing device of claim 1, wherein:

a second inference model corresponding to images acquired by the second endoscope, and having the same or similar specification as the first inference model, is created with images selected from the image group constituting the training data candidates as training data.

3. The information processing device of claim 1, wherein:

the image group that has been obtained at the first time and the image group that has been obtained at the second time acquired for the first inference model creation are stored in a memory.

4. The information processing device of claim 1, further comprising:

at least one or a plurality of first request processors, that request annotation for training data in order to create a third inference model that is an improvement on the first inference model, on the image group constituting training data candidates, in accordance with reliability of the result of having performed inference of the same images with the first inference model, in the image group constituting training data candidates.

5. The information processing device of claim 1, further comprising:

at least one or a plurality of second request processors that classify the image group constituting training data candidates, that has been acquired from the second endoscope and classified as for inference model creation for the second endoscope, and request annotation on the image group classified in order to create an inference model corresponding to images acquired using the second endoscope, and that has the same or similar specifications as the first inference model.

6. The information processing device of claim 1, further comprising:

at least one or a plurality of input determination processors that determine whether images input to the first inference model are from the second endoscope, in accordance with results when the images have been input to the first inference model.

7. The information processing device of claim 1, further comprising:

at least one or a plurality of appending processors that append metadata to individual images forming the image group.

8. The information processing device of claim 1, wherein:

at least one or a plurality of classifying processors use an image group that was obtained at the first time when the first inference model was created, to determine features of that image group, and classify from among images that have been acquired from the second endoscope, that is different from the first endoscope, as annotation candidate images.

9. An information processing method capable of collaboration with a learning method to determine, for the purpose of performing determination of specified image features, for images that have been obtained successively from a first endoscope, whether an image group that has been obtained in time series by the first endoscope is an image group obtained at a first time or an image group obtained at a second time, and to create a first inference model for image feature determination of images for the first endoscope by performing learning with results of having performed annotation on the image group that was obtained at the second time as training data, the information processing method comprising:

classifying image groups constituting training data candidates, within an image group from the first endoscope that has been newly acquired, or an image group from a second endoscope, using the image group that has been obtained at the first time, when the first inference model was created.

10. The information processing method of claim 9 further comprising:

creating a second inference model corresponding to images acquired by the second endoscope, and having the same or similar specification as the first inference model, with images selected from the image group constituting the training data candidates training data as training data.

11. The information processing method of claim 9 further comprising:

requesting annotation for training data in order to create a third inference model that is an improvement on the first inference model, on the image group constituting training data candidates, in accordance with reliability of results of having performed inference of the same images with the first inference model, in the image group constituting training data candidates.

12. The information processing method of claim 9 further comprising:

classifying the image group constituting training data candidates, that has been acquired from the second endoscope and classified, as for inference model creation for the second endoscope, and requesting annotation on the image group classified in order to create an inference model corresponding to images acquired using the second endoscope, and that has the same or similar specifications as the first inference model.

13. The information processing method of claim 9 further comprising:

determining that images are from the second endoscope, in accordance with results when an image has been input to the first inference model.

14. The information processing method of claim 9 further comprising:

appending metadata to various images that constitute the image group.

15. The information processing method of claim 9 further comprising:

using an image group that was obtained at the first time when the first inference model was created, to determine features of that image group, and classify from among images that have been acquired from the second endoscope, that is different from the first endoscope, as annotation candidate images.

16. A non-transitory computer-readable medium, storing a processor executable code, which when executed by at least one processor, performs an information processing method that is capable of collaboration with a learning method to determine, for the purpose of performing determination of specified image features, for images that have been obtained successively from a first endoscope, whether an image group that has been obtained in time series by the first endoscope is an image group obtained at a first time or an image group obtained at a second time, and to create a first inference model for image feature determination of images for the first endoscope by performing learning with results of having performed annotation on the image group that was obtained at the second time as training data, the information processing method comprising:

classifying image groups constituting training data candidates, within an image group from the first endoscope that has been newly acquired, or an image group from a second endoscope, using the image group that has been obtained at the first time, when the first inference model was created.

17. The non-transitory computer-readable medium of claim 16, the information processing method comprising:

creating a second inference model corresponding to images acquired by the second endoscope, and having the same or similar specification as the first inference model, with images selected from the image group constituting the training data candidates training data as training data.

18. The non-transitory computer-readable medium of claim 16, the information processing method comprising:

requesting annotation for training data in order to create a third inference model that is an improvement on the first inference model, on the image group constituting training data candidates, in accordance with reliability of results of having performed inference of the same images with the first inference model, in the image group constituting training data candidates.

19. The non-transitory computer-readable medium of claim 16, the information processing method comprising:

classifying the image group constituting training data candidates, that has been acquired from the second endoscope and classified, as for inference model creation for the second endoscope, and requesting annotation on the image group classified in order to create an inference model corresponding to images acquired using the second endoscope, and that has the same or similar specifications as the first inference model.

20. The non-transitory computer-readable medium of claim 16, the information processing method comprising:

determining that images are from the second endoscope, in accordance with results when an image has been input to the first inference model.

\* \* \* \* \*